United States Patent
Kandasamy et al.

(10) Patent No.: US 8,725,794 B2
(45) Date of Patent: May 13, 2014

(54) ENHANCED WEBSITE TRACKING SYSTEM AND METHOD

(75) Inventors: David Rajendran Kandasamy, Palo Alto, CA (US); Mitra Naeimi, Hillsborough, CA (US); Patrick Hernandez Dionisio, Washington, DC (US); Robert Fan, Palo Alto, CA (US)

(73) Assignee: Tracking.Net, Palo Alto, CA (US)

( * ) Notice: Subject to any disclaimer, the term of this patent is extended or adjusted under 35 U.S.C. 154(b) by 503 days.

(21) Appl. No.: 12/894,073

(22) Filed: Sep. 29, 2010

(65) Prior Publication Data
US 2011/0185016 A1    Jul. 28, 2011

Related U.S. Application Data

(60) Provisional application No. 61/249,751, filed on Oct. 8, 2009, provisional application No. 61/247,365, filed on Sep. 30, 2009.

(51) Int. Cl.
*G06F 15/16* (2006.01)

(52) U.S. Cl.
USPC .......................................................... 709/203

(58) Field of Classification Search
CPC ................................. G06Q 10/06; G06Q 30/02
USPC .......................................................... 709/203
See application file for complete search history.

(56) References Cited

U.S. PATENT DOCUMENTS

| | | | |
|---|---|---|---|
| 6,237,033 B1 | 5/2001 | Doeberl et al. | |
| 6,499,052 B1 | 12/2002 | Hoang et al. | |
| 7,149,958 B2 * | 12/2006 | Landsman et al. | 715/205 |
| 2002/0078191 A1 | 6/2002 | Lorenz | |
| 2003/0023488 A1 | 1/2003 | Landsman et al. | |
| 2003/0037131 A1 | 2/2003 | Verma | |
| 2004/0044963 A1 * | 3/2004 | Uchiyama et al. | 715/513 |
| 2004/0187076 A1 | 9/2004 | Ki et al. | |
| 2006/0265495 A1 | 11/2006 | Butler et al. | |
| 2008/0209050 A1 * | 8/2008 | Li | 709/227 |
| 2008/0289029 A1 * | 11/2008 | Kim et al. | 726/12 |
| 2011/0010612 A1 * | 1/2011 | Thorpe et al. | 715/234 |

* cited by examiner

*Primary Examiner* — Quang N Nguyen
*Assistant Examiner* — David X Yi
(74) *Attorney, Agent, or Firm* — Haverstock & Owens LLP

(57) ABSTRACT

An enhanced tracking system comprises an enhanced tracking server for storing and remotely executing one or more third party tags that have been removed from a client website. As a result, a visitor browser only needs to process the webpage itself such that the time required for a browser to display at the client website is reduced. The remote processing of the third party tags is able to be initiated by an enhanced tag placed on the client website or through a redirect process.

66 Claims, 9 Drawing Sheets

1002

```
<!-- LEADLANDER CODE START -->
<!-- <script type="text/javascript" language="javascript">i=12369</script>
<script type="text/javascript" language="javascript" src="https://trackalyzer.com/trackalyze_secure.js"></script> -->
<!-- LEADLANDER CODE END -->
<!-- GOOGLE ANALYTICS --> <script src="https://ssl.google-analytics.com/urchin.js" tpye="text/javascript"> </script>
<script tpye="text/javascript">_uacct = "UA-1359290-1"; urchinTracker(); </script>
<!-- Start of HubSpot Logging Code --> <script tpye="text/javascript" language="javascript"> var hs_portalid=1493; var hs_salog_version = "2.00";
  var hs_ppa = "test.hubspot.com" // var hs_title = "Title Override"; </script> <!-- End of HubSpot Logging Code -->
<!-- Start of Genius Logging Code --> <script language='JavaScript' tpye='text/javascript'>if (self==top){document.write("<scr" + "ipt type='text/
  javascript' language='JavaScript' id='GenuisCode' src='" + location.protocol + '//fjhea.rsvpgenius.com/mgTrack1.js?mgcid=f436dmo' + "'>
  <\/ scr" + "ipt>");}</script> <!-- End of Genius Logging Code -->
</body>
```

1020

1004

```
<!-- TN Tag --> <script type="text/javascript"> var protocolType = (("https:" == document.location.protocol) ? "https://": 
  "Version 1"; document.write(unescape("%3Cscript src='" + protocolType + "responder1.trtk.net/responder/tnResponder.JScript/tnResponder.js'
  " + "type='text/javascript'%3E%3C/script%3E")); </script> <script type="text/javascript"> initResponder(4); getResponder(); </script>
<!-- END TN TAG -->
```

Fig. 10

ENHANCED WEBSITE TRACKING SYSTEM AND METHOD

CROSS-REFERENCE TO RELATED APPLICATIONS

This application claims the benefit of U.S. Provisional Patent Application Ser. No. 61/249,751, filed Oct. 8, 2009 and entitled ENHANCED WEBSITE TRACKING SYSTEM AND METHOD, and U.S. Provisional Patent Application Ser. No. 61/247,365, filed Sep. 30, 2009 and entitled ENHANCED WEBSITE BROWSING SYSTEM AND METHOD; both of which are hereby incorporated herein by reference in its entirety for all purposes.

FIELD OF THE INVENTION

The present invention relates to a tracking system for a website, in particular a tag accelerator and tracking management system for website publishers and marketing services vendors.

BACKGROUND OF THE INVENTION

In general, most major websites employ some form(s) of a tracking system. While their service is invaluable, there are inconveniences associated with them. The tracking systems having multiple third party tags are often used to track visitors to a client website. The execution of the multiple third party tracking tags or codes of the tracking systems add to the time required to load the client website or web page to the visitor's browser. For example, in referring to the system 100 of FIG. 1, when the client's website uses three third party tags 104 including Omniture, Doubleclick and Atlas the total delay added to the web page load time due to the execution of the third party tags 104 on the visitors browser 106 is 1.5 seconds. The delay in the page load can result in a weaker quality score for adword campaigns such as Google Adwords Search Engine Marketing (SEM) campaigns as well as a poor user experience. To help compensate, publishers often place tracking tags at the bottom of the page's HTML. Accordingly, the multiple tracking tags result in slow performance, complex maintenance (long lead time; requires technical know-how), difficulty switching between tracking systems and increased risk of page crashes.

SUMMARY OF THE INVENTION

An enhanced tracking system is described herein. The enhanced tracking system comprises an enhanced tracking server for removing one or more third party tags from a client website and storing the tags on the enhanced tracking server for remote parallel execution. As a result, a visitor browser only needs to process the webpage itself such that the time required for a browser to display at the client website is reduced. The remote processing of the third party tags is able to be initiated by an enhanced tag placed on the client website or through a redirect process.

One aspect of the present application is directed to an enhanced tracking system over a network. The system comprises a browser coupled to the network for displaying websites to a user, a client website coupled to the network having one or more tags for tracking information related to the browser, one or more enhanced servers coupled to the network for receiving at least one of the one or more tags from the client website and one or more third party servers coupled to the network and associated with the one or more tags for receiving the information related to the browser, wherein the enhanced servers execute the at least one of the one or more tags when the browser attempts to display the client website. In some embodiments, the one or more tags comprise one or more of tracking tags and ad serving tags. In some embodiments, the enhanced servers execute the at least one of the one or more tags in parallel. In some embodiments, the enhanced servers automatically extract all of the one or more tags from the client website. In some embodiments, the enhanced servers selectively extract the at least one of the one or more tags from the client website based on selections by a client associated with the client website. The system further comprises a user interface that permits the client to select which of the one or more tags are executed on the enhanced servers and which of the one or more tags are executed on the browser. In some embodiments, the extracted tags are replaced on the client website by at least one enhanced tracking tag associated with the enhanced servers. In some embodiments, the enhanced servers utilize the enhanced tracking tag to mimic the environment of the browser. In some embodiments, the execution of the at least one of the one or more tags is based on the browser environment. In some embodiments, the browser environment comprises one or more of a user-agent of the browser, the IP address of the browser, an environmental fingerprint, an incoming URL to the website, the URL of the website and a tag execution engine. In some embodiments, the one or more enhanced servers further comprises a persistent storage, and further wherein the browser environment and at least one browser identifier correlating the browser environment to the browser are stored in the persistent storage. In some embodiments, the persistent storage comprises a cookie database or a flash variable data storage. In some embodiments, the browser further comprises one or more persistent data values that are also stored in the persistent storage, wherein the browser identifier correlates the browser with the one or more persistent data values. In some embodiments, based on the persistent storage the one or more enhanced servers are able to determine which of the one or more third party servers is to be credited for a transaction. In some embodiments, a proxy application stored on at least one of the one or more enhanced servers selects a designated proxy server of the one or more enhanced servers to communicate with the one or more third party servers during the execution process. In some embodiments, the proxy application selects the designated proxy server based on the geographical proximity of the designated proxy server to an IP address of the browser. In some embodiments, the enhanced servers are able to modify a link leading to the client website such that the link points to the enhanced servers thereby directing the browser to the enhanced servers. In some embodiments, the link includes identification corresponding to the client website such that the enhanced tracking servers are able to redirect the browser to the client website. In some embodiments, if the one or more enhanced servers fail, all of the one or more tags are executed on the browser until the enhanced servers are restored. In some embodiments, the enhanced servers execute the at least one of the one or more tags on the browser if the at least one of the one or more tags cannot be properly executed by the enhanced servers. In some embodiments, the enhanced servers pass one or more variables associated with the client website from the client website to the one or more third party servers for storage on the third party servers.

Another aspect of the present application is directed to a method of tracking a client website over a network. The method comprises extracting from the client website at least one of one or more tags, receiving the at least one of the one or more tags at one or more enhanced servers, executing the at least one of the one or more tags on the one or more enhanced servers when a browser attempts to display the client website to a user, receiving information related to the browser at one or more third party servers associated with the one or more tags. In some embodiments, the one or more tags comprise one or more of tracking tags and ad serving tags. In some embodiments, the enhanced servers execute the at least one of the one or more tags in parallel. In some embodiments, the extraction of the at least one of the one or more tags comprises the enhanced servers automatically extracting all of the one or more tags from the client website. In some embodiments, the extraction of the at least one of the one or more tags comprises the enhanced servers selectively extracting the at least one of the one or more tags based on selections by a client associated with the client website. The method further comprises permitting the client to select which of the one or more tags are to be executed on the enhanced servers and which are to be executed on the browser. The method further comprises replacing the extracted tags on the client website with at least one enhanced tracking tag associated with the enhanced servers. The method further comprises mimicking the environment of the browser with the enhanced servers utilizing the enhanced tracking tag. In some embodiments, the execution of the at least one of the one or more tags is based on the browser environment. In some embodiments, the browser environment comprises one or more of a user-agent of the browser, the IP address of the browser, an environmental fingerprint, an incoming URL to the website, the URL of the website and a tag execution engine. The method further comprises storing the browser environment and identification data correlating the browser environment to the browser in a persistent storage on the one or more enhanced servers. In some embodiments, the persistent storage comprises a cookie database or a flash variable data storage. The method further comprises storing one or more persistent data values of the browser in the persistent storage, wherein the browser identifier correlates the browser with the one or more persistent data values. The method further comprises determining which of the one or more third party servers is to be credited for a transaction based on the persistent storage with the one or more enhanced servers. The method further comprises selecting a designated proxy server of the one or more enhanced servers to communicate with the one or more third party servers during the execution process with a proxy application stored on at least one of the one or more enhanced servers. In some embodiments, the proxy application selects the designated proxy server based on the geographical proximity of the designated proxy server to an IP address of the browser. The method further comprises modifying a link to the client website with the enhanced servers such that the link points to the enhanced servers thereby directing the browser to the enhanced servers. In some embodiments, the link includes identification corresponding to the client website such that the enhanced tracking servers are able to redirect the browser to the client website.

Another aspect of the present application is directed to an enhanced tracking server for tracking a client website. The server comprises an extraction application, wherein the extraction application extracts at least one of one or more tags from the client website and a tag execution engine, wherein the tag execution engine receives browser information related to a browser, execute the at least one of the one or more tags with the browser information when the browser attempts to display the client website, and transmit the browser information to one or more third party servers associated with the one or more tags. In some embodiments, the one or more tags comprise one or more of tracking tags and ad serving tags. In some embodiments, the tag execution engine executes the at least one of the one or more tags in parallel. In some embodiments, the extraction application automatically extracts all of the one or more tags from the client website. The server further comprises a tag manager that permits a client associated with the client website to select which of the one or more tags are extracted from the client website. In some embodiments, the tag manager further permits the client associated with the client website to select which of the one or more tags are executed by the browser and which are executed by the enhanced server. In some embodiments, the enhanced server utilizes an enhanced tracking tag on the client website to mimic the environment of the browser. In some embodiments, the execution of the at least one of the one or more tags is based on the browser environment. In some embodiments, the browser environment comprises one or more of a user-agent of the browser, the IP address of the browser, an environmental fingerprint, an incoming URL to the website, the URL of the website and a browser tag execution engine. The server further comprises an enhanced persistent storage that stores all persistent data values found on each browser that attempts to display the client website along with a browser identifier that correlates each browser with the corresponding stored persistent data values. In some embodiments, the persistent storage is a cookie database or a persistent storage for storing Adobe Flash data as are well known in the art. In some embodiments, the browser environment is stored in the persistent storage, wherein the browser identifier correlates the browser environment to the browser. In some embodiments, based on the persistent storage the server is able to determine which of the one or more third party servers is to be credited for a transaction. The server further comprises a proxy application that selects a designated proxy server of the one or more additional enhanced servers to communicate with the one or more third party servers during the execution process. In some embodiments, the proxy application selects the designated proxy server based on the geographical proximity of the designated proxy server to an IP address of the browser. The server further comprises a modification element that modifies a link leading to the client website such that the link points to the enhanced server thereby directing the browser to the enhanced server. In some embodiments, the link includes identification corresponding to the client website such that the enhanced tracking server are able to redirect the browser to the client website.

Another aspect of the present application is directed to a tag manager stored on one or more tag tracking servers for presenting a client associated with a client website with tag management options. The tag manager comprises a content database for storing tags and a user interface that permits the client to select which of one or more third party tags on the client website are to be extracted from the client website and stored in the content database. In some embodiments, the user interface permits the client to select which of the third party tags are executed on the one or more servers and which of the third party tags are executed on a browser when a user attempts to display the client website on the browser. In some embodiments, the user interface is further configured to permit the client to select a programming language to which an enhanced tracking tag to be placed on the client website conforms. In some embodiments, the programming language comprises JavaScript or HTML. In some embodiments, wherein the user interface is further configured to permit the client to select a redirect option that causes the one or more servers to place a pointer on links to the client website such that when the user attempts to display the client website a browser of the user is first directed to the one or more servers. In some embodiments, wherein the content database further stores one or more rules, and further wherein the tag manager executes the selected third party tags based on the one or more stored rules. In some embodiments, wherein the rules are based on one or more of the URL of the client website and a flag on one or more of the third party tags.

Another aspect of the present application is directed to a persistent storage stored on one or more tag tracking servers for tracking users of a client website. The persistent storage comprises one or more persistent data values found on each browser of the users that attempt to display the client website and one or more browser identifiers for each browser, wherein the browser identifiers correlate each browser with the corresponding stored persistent data values found on each browser. The persistent storage further comprises one or more browser environments associated with each browser that attempts to display the client website, wherein the browser identifiers correlate each browser with the corresponding stored browser environments found on each browser. In some embodiments, the browser environments comprise one or more of a user-agent of the browser, the IP address of the browser, an environmental fingerprint, an incoming URL to the client website, the URL of the client website and a browser tag execution engine.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 10 illustrates examples of tracking tags and an example of an accelerator tag that used to replace the tracking scripts included in a webpage.

DETAILED DESCRIPTION OF THE PREFERRED EMBODIMENT

After reading this description, it will become apparent to one skilled in the art how to implement the invention in various alternative embodiments and alternative applications. Although various embodiments of the present invention are described herein, it is understood that these embodiments are presented by way of example only, and not limitation. As such, this detailed description of various alternative embodiments should not be construed to limit the scope or breadth of the present invention as set forth in the appended claims.

The enhanced tracking system comprises an enhanced tracking server for storing and executing one or more third party tags from a client website after the tags have been removed from the client website. In some embodiments, the stored tags are able to be executed in parallel. As a result, a visitor browser only needs to process the webpage itself instead of having to wait until each of the tracking tags on each of the third party servers is executed on the browser as well. Due to this remote (and sometimes parallel) tracking tag execution (which is performed concurrently as the browser loads the other page content), the time required for a browser to display at the client website is significantly reduced. This remote processing of the third party tags is able to be initiated by an enhanced JavaScript or HTML tag placed on the client website or through a redirect process that modifies the links to the website such that the browser is first directed to the enhanced tracking server before being redirected to the client webpage.

Figure 2:
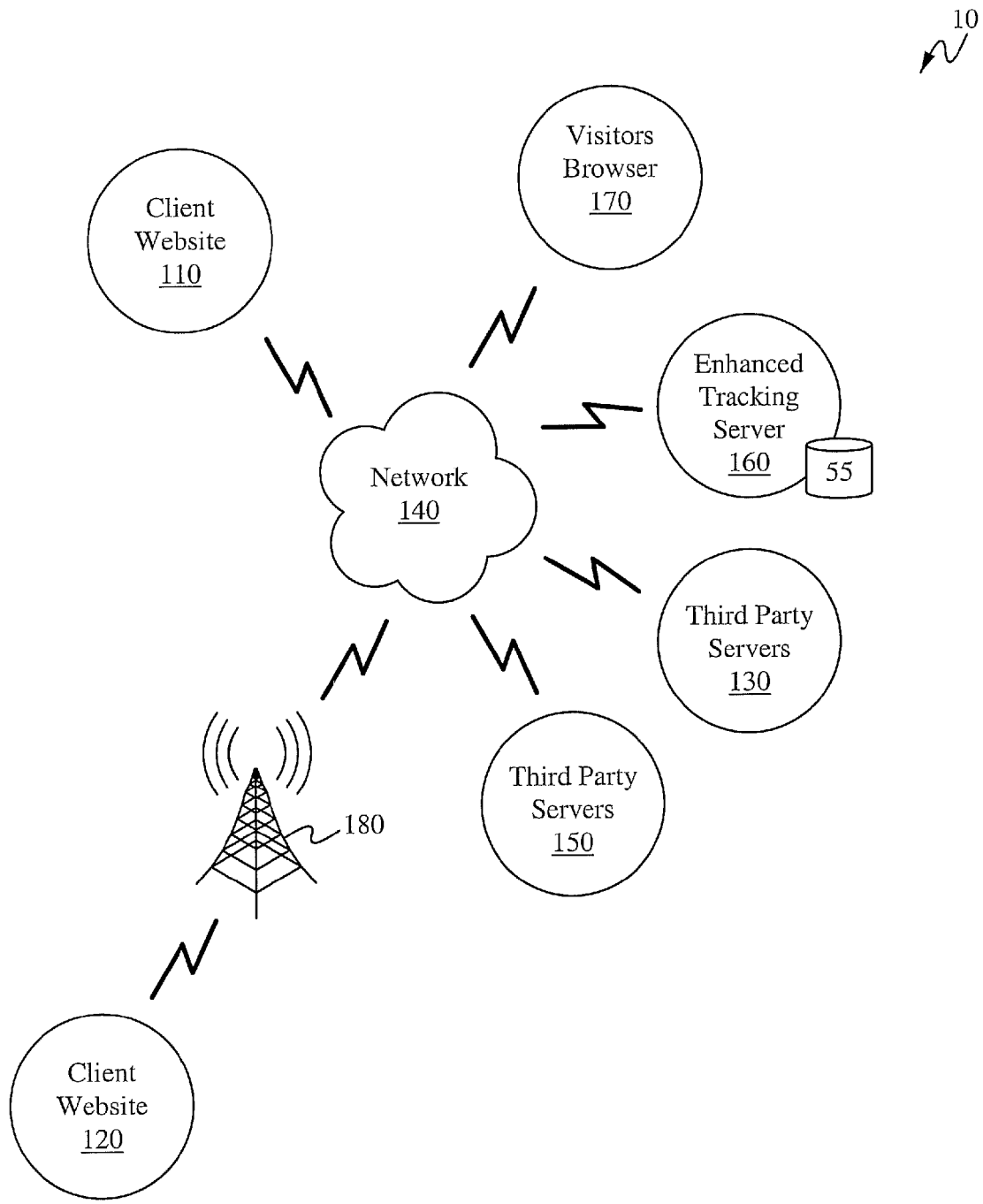
FIG. 2 is a high-level network diagram illustrating an example website tracking system according to some embodiments.

In one aspect, a system and method for providing enhanced tracking for websites is provided. FIG. 2 is a high-level network diagram illustrating an example website tracking network according to some embodiments. In general, one embodiment of the website tracking network 10 includes client websites 110 and 120, third party servers or system 130 and 150, a network 140 (e.g. the internet), an enhanced tracking server 160, a wireless base station 180, a visitor's computer including a browser 170 and storage device 55. It should be noted that the third party servers or system 130, 150 are able to tracking servers and/or ad servers. The client websites 110 and 120 are hosted by client servers (not shown) and are in communication with the enhanced tracking server 160 via the network 140 and/or a wireless base station 180, for example. The network 140 is able to be a combination of multiple communication networks.

The client servers hosting the client websites 110 and 120 are able to be any sort of server with the ability to communicate within the website tracking network 10. The client servers hosting the client websites 110 and 120 are able to also include a persistent storage area. The client servers supporting the client websites 110 and 120 are able to communicate by sending packets of information back and forth.

Enhanced tracking server 160 is able to be implemented as a single computer or as a plurality of servers logically arranged. The multiple enhanced tracking servers 160 are able to be located in different locations. For example, the multiple enhanced tracking servers 160 are able to be strategically positioned at locations that are within the same geographic proximity of the computer system or devices hosting the visitor's browsers 170 that are tracked by the enhanced tracking server 160. The multiple enhanced tracking servers 160 in different geographic locations or proximities are able to be proxy servers (FIG. 3, geo proxy 326) of an original enhanced tracking server 160. Proxy servers of the enhanced tracking server 160 are also able to be located within the proximity of the third party servers 130 and 150. The proxy servers in different geographic locations are able to be selected according to a geo-proximity implementation 326 on the enhanced tracking server 160. The geo-proximity implementation 326 is able to select the proxy server closest to the visitor's browser IP address, for example.

According to some embodiments, the enhanced tracking server 160 is able to provide IP address emulation. The IP address of the computer system that generates the browser 170 is able to be used to determine the geographic location of the visitor to a website 110. This geographic information is able to be used to select content for display to the visitor that is related to the visitor's geographic location. For example, the geographic location of the visitor is able to be used to provide advertisements for businesses that are located near the visitor. Visitors to a website are able to be distributed over a wide geographic area and the enhanced tracking server 160 is able to be located in a different geographic location than a visitor. In some embodiments, the enhanced tracking server 160 is able to route calls to ad servers, tracking servers, and/or other content providers (such as third party servers or systems 130 and 150), through conventional HTTP proxy servers located throughout the world. In some embodiments, the enhanced tracking server 160 is able to select a HTTP proxy server that is located in proximity to the visitor's computer system 170 in order to have requests to the ad servers, tracking servers, and/or other content providers originate from an IP address that is near the location of the visitor to the website. The enhanced tracking server 160 is also able to translate the IP address of the computer system to a geo-location. In some embodiments, the enhanced tracking server 160 transmits the calculated geo-location to one or more third party tags/server for storage and use in returning targeted ads based on the geo-location received from the enhanced server 160.

In one embodiment, the enhanced tracking server 160 identifies all third party tags associated with the client websites 110 and 120. A tag is a piece of code that is placed on a client website 110, for example, that is executed when a visitor visits the client website 110 to extract statistical data or public details/information associated with the visitor. It should be noted that as used herein, the third party tags are able to comprise one or more of tracking tags, ad serving tags and other types of tags used on websites as are well known in the art. In particular as will be described in detail below, tracking tags and ad server tags operate similarly except that more calls are required to fully execute ad serving tags in order to serve the ad content to the website. For example, in tracking tag execution only a start tag is needed to be executed by the browser such that the third party tags are executed on the enhanced server 160 and data from the browser 170 is able to be stored and reported by the third party servers 130, 150. In ad serving tag execution, additional spot and fetch tags are needed in order to receive and render the ad content from the third party servers 130, 150. Specifically, in some embodiments, ad serving tags are able to be executed by calling a start tag at the top of the client website 110, 120, wherein one or more spot tags are also on the website 110, 120 to serve as placeholders for the positions on the website 110, 120 where the ad content will be rendered. A fetch tag is able to be placed on the website at the end of the page in order to gather the ad image URLs or other ad content from the third party servers 130, 150 so that it is able to be rendered in the positions marked by the spot tags.

In some embodiments, one or more of the third party tags are JavaScript that is generated and sent to the user's browser 170 to collect the user's public details. Alternatively, the one or more third party tags are able to be IMG tags or other programming language tags as are well known in the art. The enhanced tracking server 160 in conjunction with an auto-extractor for websites, for example, captures and removes the third party tags from the client websites 110 and 120. Alternatively, the third party tags are identified and removed manually from the client websites 110, 120. In some embodiments, the third party tags are replaced with one or more enhanced tracking tags or tracking net tags. The enhanced tracking tags are able to be downloaded or received by the client websites 110 and 120 to replace the tracking tags of the third party servers 130 and 150. The enhanced tracking tags are also able to be used in conjunction with other third party tags on the client websites 110 and 120.

Tracking tags or ad server tags, such as the tracking tag 1002 illustrated in FIG. 10, are able to be used to replace one or more tracking scripts, such as the tracking scripts 1020, which execute tracking events when a webpage is loaded in a visitor's browser 170. A tracking tag is able to be associated with tracking scripts that access multiple tracking servers, as illustrated in FIG. 10. In some embodiments, the enhanced tracking server 160 executes the tracking scripts associated with the tracking tag making HTTP requests to the tracking server or servers referenced by the tracking scripts when the visitor's browser executes the tracking tag. The enhanced tracking server 160 stores the tracking scripts associated with the tracking tag in a datastore 55. The tracking scripts are associated with a unique tag identifier that the visitor's browser provides to the enhanced tracking server 160 when the tracking server accesses the webpage. In some embodiments, the enhanced tracking server 160 accesses the tracking scripts associated with the tag identifier and executes the scripts in response to the visitor's browser sending an HTTP request to the enhanced tracking server 160 as a result of the visitor's browser executing the tracking tag.

In some embodiments, the client identifies the third party tags implemented on each of the client websites 110 and 120. The third party tags are then incorporated or associated with the enhanced tracking server 160 in such a way that the third party tags are able to be executed on the enhanced tracking server 160 instead of the visitor's browser 170. This way the visitor is able to browse the website unmolested by multiple execution of third party tags. In the illustrated embodiment, enhanced tracking server 160 is coupled to a data storage area 55. In one embodiment, the enhanced tracking server 160 allows tracked website pages to load faster. The enhanced tracking system is also able to manage the debugging and installation of tracking tags (third party tags) throughout the websites 110 and 120 where the tags are associated with the third party servers/system 130 and 150. In some embodiments, the enhanced tracking systems are able to be implemented using a redirect instead of a tag. When tracking is implemented with redirects, there is no code placed on the client's website. Rather, the link leading to the website points to the enhanced tracking system, and includes an ID or encoded URL so the tracking system is able to redirect the browser to the final destination after counting the hit. In some embodiments, the enhanced tracking server 160 is able to utilize conversion tags while implementing a redirect instead of a tracking tag. In such embodiments, HTML or another type of redirect code is placed on the website 110 itself, wherein the redirect code causes the browser to be redirected to the enhanced server 160 upon executing the code on the website 110. As a result, the enhanced server 160 is able to provide the advantage of tracking conversions with a tracking tag while implementing a redirect system.

The third party servers 130 and 150 generally track a user's visit to the client websites 110 and 120 by executing the third party tags on the visitor's browser to monitor the visitor's public details. In general, the client decides what webpages or websites 110 and 120 they wish to track and the tracking tags associated with one or more third party servers 130 or 150 are added to those websites 110. The tracking tags are configured to be executed on the visitor's browser 170. In one embodiment, the tracking tags are pieces of code that are placed on the client website 110 so that when a visitor visits the website, the piece of code is executed on the visitor's browser 170 and the visitors public details/information are analyzed and stored for reporting. In some embodiments, ad serving tags are able to be added to the websites 110 in addition to the tracking tags or in place of the tracking tags. The ad serving tags are also pieces of code that are placed on the client website 110 and configured to be executed on the visitor's browser 170. However, instead of simply analyzing/reporting the visitor's public information, the ad serving tags are also able to return content to the website based on the identity of the visitor. In particular, third party tracking/ad servers 130, 150 are able to select content to be returned to and displayed on the website 110 associated with the ad serving tags based on the identity of the visitor.

The visitor's public details collected by the tracking tags are able to include information such as internet protocol (IP) address, browser information, operation system information, referrer information, page title, universal resource locator, geographic location of visitors (for example the countries of the visitors), search terms that were used to find the website, the search engines used to find the website. A referrer list is able to show where all traffic to the website is referred from. When visiting a webpage or website, the referrer or referring page is the Uniform Resource Locator (URL) of the previous webpage from which a link was followed. More generally, a referrer is the URL of a previous item which led to this request. The referrer for an image, for example, is generally the HyperText Markup Language (HTML) page on which it is to be displayed. The referrer field is an optional part of the Hypertext Transfer Protocol (HTTP) request sent by the browser program to the web server. Many websites log referrers as part of their attempt to track their users or visitors.

The visitor's or user's browser 170 is able to be supported by a computer system or server. The computer device or server is able to be any sort of device with the ability to communicate within the website tracking network 10. For example, the computer system or server is able to be a cell phone, a laptop computer, personal computer, a personal digital assistant ("PDA"), a portable computer with wireless connectivity (e.g. a laptop computer) or any other device configured for network communication.

Figure 1:
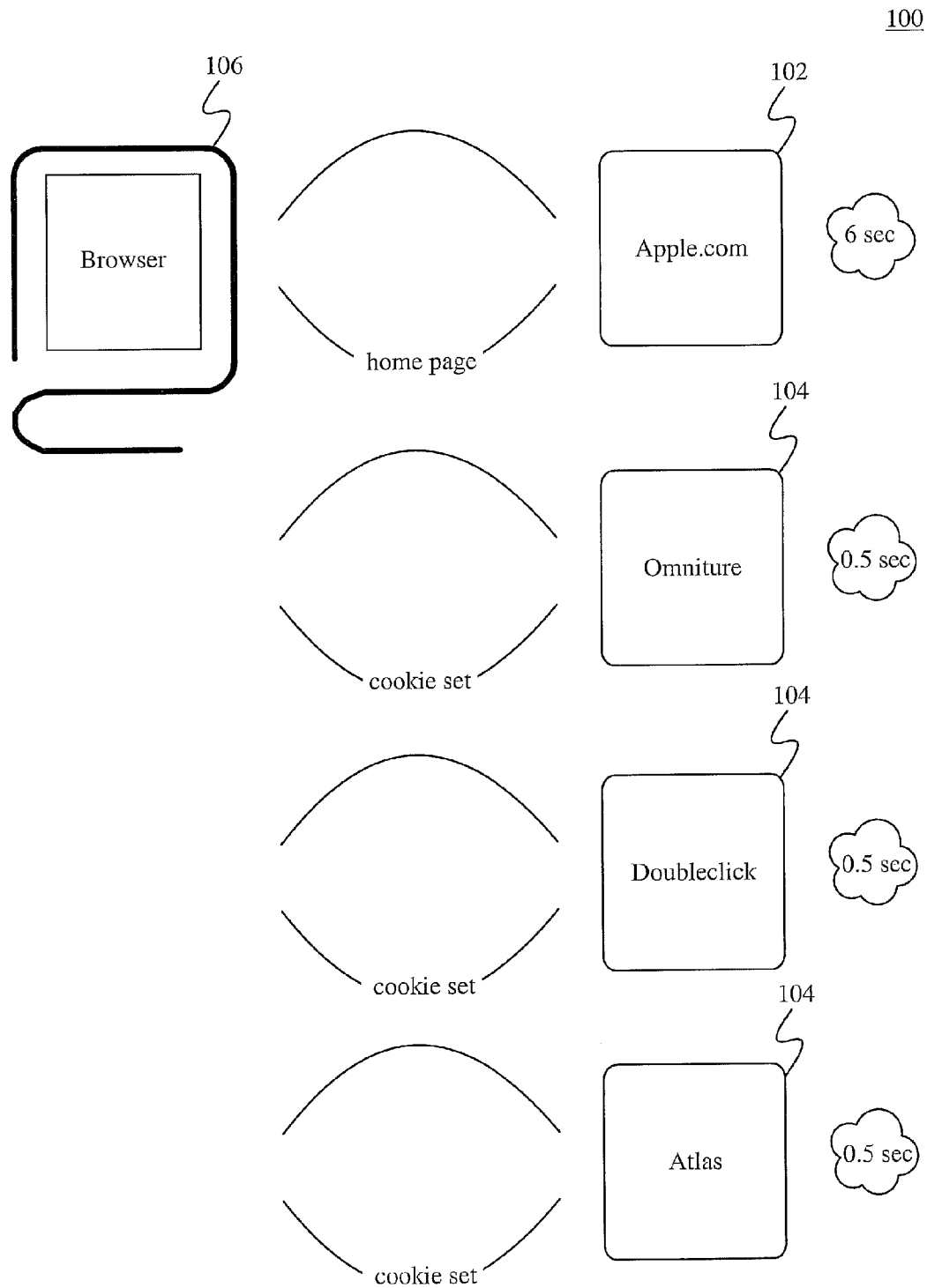
FIG. 1 illustrates an example of a prior art tracking architecture.

It should be noted that many components that are included in the elements of FIG. 1 and the subsequent figures have been omitted to make the descriptions more clear. One will note that these omitted elements such as additional base stations, networks, processors, network ports, memories, buses and transceivers, would be included in such elements in a manner that is commonly known to those skilled in the art.

Figure 3:
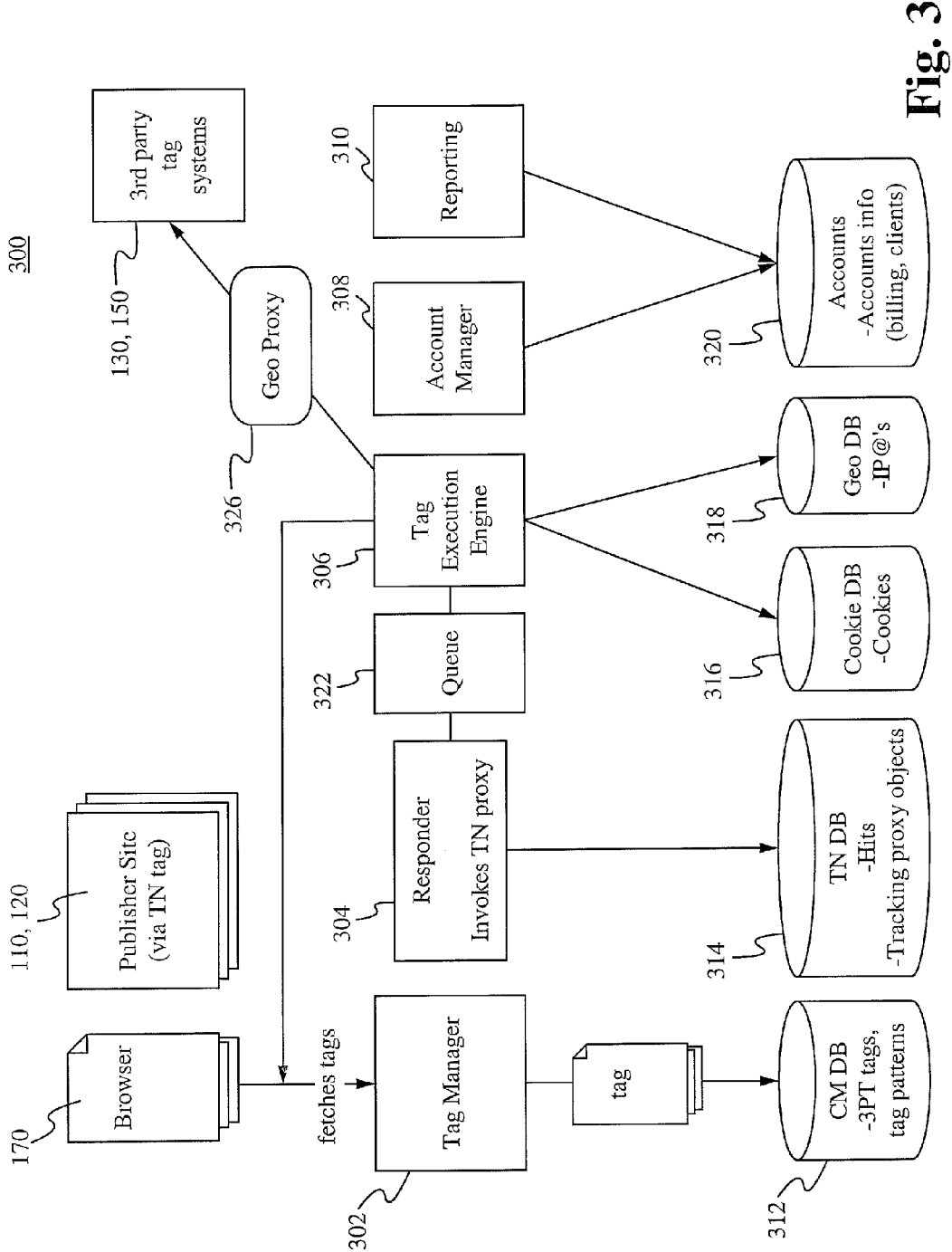
FIG. 3 illustrates a browsing architecture according to some embodiments of the enhanced tracking system.

The enhanced tracking system provides tracking accelerator and management solutions for online publishers, website owners and marketing. FIG. 3 illustrates a browsing architecture 300 according to some embodiments of the enhanced tracking system. For explanatory purposes, FIG. 3 will be discussed with reference to FIG. 2 above. One of the key elements of the enhanced tracking system is the ability to execute third party tags on a separate server such as the enhanced tracking server 160 rather than the visitor's browser 170. To do this requires the encapsulation of the visitor's browser environment 170 to allow it to be mimicked on the enhanced tracking server 160. This includes acquiring the user-agent of the browser, the IP address of the browser, various environmental fingerprints (such as the version of Flash installed), incoming URL to the page, the URL of the page itself, the Referrer, for example. In some embodiments, encapsulating the browser 170 includes a captive use of a JavaScript/HTML engine (e.g. the core components of the visitor browser 170) on the enhanced tracking server 160 that allows the enhanced tracking server 160 to mimic the visitor's browser 170. Alternatively, the engine is able to be other browser executable environments as are well known in the art. In order to execute the 3rd party JavaScript tags, a JavaScript engine or other tag engine, for example, are able to be required to interpret the tags. In other embodiments, including redirect-style third party system, JavaScript engine, for example, is not needed for execution.

In some embodiments, the enhanced tracking server 160 is configured to maintain the context of the visitor's browsing session across HTTP requests. For example, the enhanced tracking server 160 is configured to use cookies or other types of persistent data to establish a unique ID that corresponds to the browser of each visitor and to mimic the environment of the visitor's browser. When the enhanced tracking server 160 makes HTTP requests for content from the client website 110 and/or the third party servers 130 and 150, the enhanced tracking server 160 provides the environmental information associated with the visitor's browser environment to the client website and/or the third party servers rather than providing the environmental information for the environment of the enhanced tracking server. Further, the unique ID is able to be stored on both the browser 170 and within a persistent storage on the enhanced server 160. As a result, the browser 170 is able to present the unique ID when interacting with website 110 and/or enhanced server 160 such that the browser 170 is able to be uniquely identified by the enhanced server 160 upon future visits. Additionally, the storage of the unique ID in the persistent storage on the enhanced server 160 allows the enhanced server 160 to be able to associate the browser 170 with the stored browser environment information via the unique ID. In other words, stored environments on the enhanced server 160 are able to be indexed based on their unique IDs such that when browsers return and submit their IDs, the enhanced server can look up the proper browser environment information using the index.

Specifically, the enhanced tracking server 160 is able to provide various parameters of the browser environment of a visitor when making an HTTP request. For example, information such as browser brand and version, screen dimensions, and/or other environmental information is able to be maintained by the enhanced tracking server 160 in a persistent storage and propagated to the third party servers 130, 150, such as advertisement servers, when making requests for content or third party servers that gather information about visitors to websites. This information enables the third party servers to accurately count the number and type of each category of visitor, as well as return images and or other content relevant to the visitor. For example, the enhanced tracking server 160 is able to provide the "User-Agent" string received from the visitor's browser (e.g. "IE," "Mozilla," etc.) and the "version" string when making an HTTP request. In some embodiments, the enhanced tracking server 160 is able to receive one or more variables from the client website 110, 120, and transmit the one or more variables to the appropriate third party tags/servers for storage or tracking. For example, if the webpage shown on the website 110 is an order confirmation page for a purchase, the enhanced tracking server 160 is able to receive the purchase price/revenue amount from the webpage and pass that variable to the third party tags or servers. As a result, the enhanced tracking server 160 is able to transfer a number of variables between the website and the third party tags/servers upon request by the third party tags/server, the client website, or other requesters such as an administrator of the enhanced tracking server. Similarly, in some embodiments, the enhanced tracking server 160 is able to make calls to other servers (e.g. a Facebook widget or Weather widget) such that the browser 170 is not required to call the other servers.

In some embodiments, the enhanced tracking server 160 is able to modify the URL associated with advertisement content to redirect to the enhanced tracking server 160, which enables the enhanced tracking server 160 to present the cookies or other types of persistent data maintained by the enhanced tracking server 160 to the ad server. The ad server is able to have recorded state information in the cookies or other types of persistent data maintained by the enhanced tracking server 160 when the advertisement content was originally requested by the enhanced tracking server 160. Thus, the ad server would be able to maintain accurate counts of click throughs by the visitor even though the requests for advertisement content have been routed through the enhanced tracking server 160.

In other words, the enhanced tracking server 160 stores and resumes the context of multiple visitor browsers 170 by keeping a database (or other type of persistent storage) of their individual cookie (or other types of persistent data) values. The mimicked visitor browser 170 on the enhanced tracking server 160 allows implementation of tracking proxy for tracking visitors of the client website 110. The tracking proxy is essentially the execution engine of the visitor browser 170. The tracking proxy is able to include the actual browser core, or a JavaScript engine, HTML engine, or other type of browser executable engine as are well known in the art. Alternatively, the tracking proxy is able to include other execution engines as are well known in the art. The website or webpage 110 is able to be identified by multiple elements including a URL (pathname) that is able to be determined automatically by the responder 304 and a page label which is able to be a string designated by the client and sent in the enhanced tracking tag. The responder 304 is the enhanced tracking system component or tracking net component that interacts with the original visitor's browser 170. Thus, when the visitor visits a client website 110, 120, they encounter an enhanced tracking tag that is executed on the visitor's browser 170. The responder 304 is the component that responds to the tag execution, for example, by setting a cookie on the browser if it's the browser's first visit to that client site. Tracking tags are able to be named and assigned to either the URL or the page label. Tracking proxy objects including the user-agent of the browser, the IP address of the browser, various environmental fingerprints (such as the version of Flash installed), incoming URL to the page, cookie values or other types of persistent data values set by the third party systems for implementing the third party tags, the URL of the page itself and the Referrer is able to be stored in the enhanced tracking server database such as the tracking net database 314 (TN DB) of FIG. 3.

In some embodiments, the tracking net database 314 is able to be incorporated into the storage device 55. The tracking proxy objects are able to be subsequently invoked by a responder 304 in the enhanced tracking server 160 for tracking a visitor's browser 170. In some embodiments, the responder 304 is independent of the enhanced tracking server and is able to be hosted by the client. A tag execution engine in the enhanced tracking server 160 waits for messages to appear in the queue 322. If the geo-proximity implementation 326 is on, the tag execution selects the proxy server closest to the visitor's browser IP address according to the geo-proximity implementation 326. In some embodiments, a tag execution engine 306 is incorporated in the proxy servers in each of the geographic locations. In other embodiments, the proxy servers are HTTP proxy servers independent of the tag execution engine 306. The tag execution engine 306 executes the third party tags in the enhanced tracking server 160. In other embodiments the client has the ability to specify the tags that should be executed on the visitor's browser 170. In some embodiments, the tag execution engine 306 is able to execute third party tags that are HTML or JavaScript tags. Alternatively, the tag execution engine 306 is able to execute any type of third party tag including Adobe Flash tags and or other types of tags using alternate languages as are well known in the art. Thus, the enhanced tracking server 160 provides the advantage of being able to execute potentially any execution/language environment available on a visitor's browser or a third party tag.

As described previously, the multiple third party tags are able to be automatically extracted from the client websites 110 and 120 for execution at the enhanced tracking server 160. In some embodiments, all of the third party tags are automatically extracted from the client websites 110, 120. In other embodiments, one or more predetermined third party tags are automatically extracted from the client websites 110, 120. Alternatively, at least one of the one or more third party tags are manually identified and removed from the client website 110, 120. The third party tags are able to be stored in the storage device 55 and later retrieved for execution in the enhanced tracking server 160. In some embodiments, an enhanced tracking tag, for example a tracking net tag, replaces the third party tags on the client websites 110 and 120.

The client website 110, for example a publisher site, is able to be instrumental in several ways including the execution of an enhanced tracking tag (such as a JavaScript tag), that is associated with the enhanced tracking server 160, image tags [IMG tags], and redirects. The IMG tag or image tag is an HTML tag used to place an image. The JavaScript tag is able to be a traditional sliver of JavaScript code which in turn collects a larger body of code from the enhanced tracking server 160 and executes it. In one embodiment the JavaScript code is executed in the visitor's browser and upon execution collects third party tags from storage for execution at the enhanced tracking server 160. Multiple versions of the JavaScript tag are able to be made available to the client or publisher website 110, for example, a first party cookie version which is able to be a default version and the third party cookie version adapted for speed. Third party cookies or other types of persistent data are generated when a tracking tag attempts to set a cookie on a different domain than the base page being interpreted. For example, when a visitor visits apple.com, and the enhanced tracking tag or tracking.net tag is executed, the cookie is set in the enhanced tracking domain or tracking.net domain instead of the visitor's browser. About 10% of browsers will not do this because of security reasons. In the case of a first party cookie, the browser is manipulated (through hundreds of lines of JavaScript, for example) into invisibly loading an actual page from the enhanced tracking server or tracking net server. That way, in setting the cookie on the enhanced tracking server or tracking.net domain, it matches the domain of the base page being loaded and thus all browsers will allow this implementation unless they are configured to not allow cookies at all. Thus, first party cookies are more accurate (by about 5%) but take longer to execute and are generally more error-prone (since so much Javascript code must be run). The JavaScript tag is also able to include the IMG tag within a <NOSCRIPT> clause. While JavaScript tags are useful for tracking, some simple browsers (e.g., cell phone browsers) will not execute JavaScript. Moreover, some websites restrict execution of code on their pages. In both these cases, IMG tags are able to be used for tracking. The IMG tag implementation resembles a simple image fetch to the browser, but allows for a cookie or other type of persistent data to be set to record the fetching activity. Redirects serve the same purpose and have the similar limitations as IMG tags. However, in the case of redirects, the website landing pages do not have to be modified at all (i.e., there's no tag on them) and the redirect has to be executed serially before the page is able to be rendered.

When a visitor visits a webpage or website 110 for the first time the enhanced tracking tag on the website 110 is sent to the visitor's browser 170 where it is executed. The execution of the enhanced tracking tag is able to include the generation of JavaScript or other code language that is sent to the user's or visitor's browser 170 to collect public details/data of the visitor. In one embodiment, the enhanced tracking tag checks if the visitor's browser already has a cookie or other type of persistent data associated with the enhanced tracking server 160. If none, a unique cookie or other type of persistent data with a unique identification (ID) is generated for the visitor browser 170, for example, and stored on the visitor's computer. The unique ID is able to include information such as the enhanced tracking tag version number, server identification, the client identification (ID), enhanced tracking tag ID, monotonically increasing number (local to this server), a time stamp in milliseconds, or other identifiers as are well known in the art. In general, anytime data is stored indefinitely a version number is included. That way, if the format of what is stored gets changed later, the data is able to be identified. The cookie or other type of persistent data generated by the enhanced tracking tag is able to be tracked over long periods of time, so that returning visitor's to the website 110 is able to be identified. In other words, the unique ID generated by the enhanced server 160 is stored on both the visitor's browser 170 and the enhanced server 160. On the visitor's browser 170, the unique ID is able to be added to communications by the browser 170 to the client website 110 and/or the enhanced server 160 such that the server 160 is able to uniquely identify or "remember" the browser 170. On the enhanced server 160, the unique ID is able to be used to receive an ID from a browser, match that ID to one of the unique IDs stored on the server 160, and thereby correlate collected public details/data of the visitor and a mimicked browser environment stored on the server to the visitor's browser 170.

Subsequently, when the visitor clicks on the website 110, the enhanced tracking server 160 looks for the cookie or other type of persistent data. If it is found the visitor is identified as a returning visitor. In one embodiment, the records, for example clicks, of the returning visitors are recorded along with any previous visits to show their lifetime records for the webpages. All of the recorded information is able to be stored in the storage device 55, for example. The tracking proxy implemented on the enhanced tracking server 160 is invoked by a responder 304 in the enhanced tracking server by sending a queue message to the tag execution engine 306 within the enhanced tracking server 160. The queue message is able to include information such as enhanced tracking tag identification, incoming URL, user-agent, IP address of browser, referrer and separate queues for each geographical region. The tag execution engine 306 waits for a message to appear in the queue 322. If the geo-proximity implementation 326 is on, the tag execution selects the proxy server closest to the visitor's browser IP address according to the geo-proximity implementation 326. In some embodiments, the tag execution engine 306 is incorporated in the proxy servers in each of the geographic locations. In other embodiments, the proxy servers are HTTP proxy servers independent of the tag execution engine 306. The tag execution engine 306 fetches a set of third party tags for the clients website or webpage 110 that was visited by the visitor based on the incoming client ID/tag ID, the incoming URL and any tag placement rules. One example of a third party tag is the Google Analytics tag. As previously described above, the tag execution engine 306 in the enhanced tracking server 160 waits for messages to appear in the queue 322.

The tag execution engine (TEE) 306 is also able to set local cookies or other types of persistent data based on the stored values of the browser in the storage device 55 or database associated with the enhanced tracking server 160. As previously described, the enhanced tracking system identifies a browser by generating and leaving a cookie or other type of persistent identifying data on the browser. As a result, when the user revisits through that browser at a later time and makes a purchase, for example, that transaction is able to be associated with the original visit (and ideally to the ad click or marketing link that generated the original visit). Thus, when the TEE 306 is executing the 3rd party tags, the 3rd party tracking systems will each need to set their cookies or other persistent data for the current browser on the enhanced server 160 (which is mimicking the environment of the current browser). When the browser revisits, the TEE 306 retrieves the cookies/data that were stored in the persistent storage on the enhanced server 160 and indexed by the generated ID for that browser from earlier visits, before executing the 3rd party tags for the current page. As a result, the TEE 306 is able to again mimic or emulate the browser environment of the original browser by mimicking the user-agent, for example. Also, in some embodiments, the TEE 306 simulates the location of the original browser by using a geo-proximate proxy server 326. In addition, in some embodiments, the TEE 306 simulate the Date/Time of the pageview and also intervals such as the time-onpage stats collected by some third party systems by running with only a short delay after the visitor is identified during a visit to a website.

Commonly, upon execution, third party tags return more code to be executed. For example, a third party tag will return code for loading an animated image on the website or for opening a new HTML iFrame. Accordingly, in some embodiments, while executing one or more third party tags, the TEE 306 will transmit a portion of the code generated by the third party tag to the browser to execute instead of executing the code itself. Specifically, in some embodiments, the TEE 306 will transmit code from the third party tags to the browser if the code is directly related to an item that is to be displayed on the client website. Further, in some embodiments, the TEE 306 will transmit code from the third party tags to the browser if the code is unable to be executed by the TEE 306. For example, if the code is too complex for the TEE 306 to process and or if the code is written in a language that the TEE 306 does not understand.

The storage device 55 of the enhanced tracking server is able to include persistent storage. In some embodiments, the persistent storage comprises multiple databases including a content management database 312 (CM DB), tracking database 314 (TN DB), a cookie DB 316, a geographic location database 318 (Geo DB) and an accounts database 320. Alternatively, the persistent storage comprises any combination of databases, storage for Adobe Flash data or other storage as is well known in the art. The TN DB 314 stores tracking proxy objects and the hits to a website (i.e. visits to the website) that are able to be invoked by the responder 304 to mimic the execution engine of the visitor browser 170, for example. In some embodiments the TN DB 314 also stores cookies or other types of persistent data for identifying the unique id of the visitor browser 170. The accounts database 320 stores account information of clients and billing information for the clients. The information stored in the accounts database 320 is able to be invoked by the account manager 308 or reporting manager 310 for processing and/or for reporting to an interested party. The enhanced tracking server 160 has the ability to store and resume the context of multiple browsers by keeping a database (cookie DB 316) of the browser's individual cookie values or other type of persistent data values. Thus, the enhanced tracking system of the present application provides the advantage of allowing the enhanced tracking server 160 to store data in a persistent storage on the enhanced tracking server 160 instead of the browser. This is in contrast to third party servers which require that the data is stored and executed by the browser itself, thereby increasing the load on the browser as well as increasing the time required to load the website.

In some embodiments, the cookie database 316 is able to comprise any type of persistent storage capable of storing cookie data or other types of persistent data. For example, in some embodiments, the persistent storage is a type of Adobe Flash storage such that it is able to store persistent data such as Adobe Flash variables ("Flash cookies"). In some embodiments, the cookie database 316 is able to store one or more visitor browser's browser environments and at least one browser identifier correlating/indexing the browser environment to the browser. In some embodiments, the browser identifier is a unique id similar to the stored cookies/data in the TN DB 314 as described above. Alternatively, the browser identifier is able to be any combination of data able to uniquely identify the corresponding browser as well known in the art. The browser identifier is also able to be stored on the browser 170 such that further communications between the browser 170 are able to be identified and correlated to the stored cookies/data. In some embodiments, the browser's one or more individual cookie/data values are also able to be stored in the cookie database 316. In some embodiments, as described above, the browser identifier is also able to correlate the browser with the one or more individual cookie/data values. As a result, the cookie database 316 of the enhanced tracking server 160 provides the advantage of allowing each individual browser to be recognized by the server 160 on each future visits. Further, the server 160 has the advantage of being able to reference the cookie/data values and browser environment of each revisited browser based on the browser identifier. Alternatively, separate browser identifiers are able to be used to separately correlate the browser to the cookie/data and the browser to the browser environment.

In some embodiments, the TEE 306 is able to utilize the stored individual cookie values or other types of persistent data values in the Cookie DB 316 to determine which of the third party servers 150, 130 will get "credit" for a visitor's purchase/transaction on or visit to the client website 110. Specifically, the TEE 306 is able to be configured to determine which ad or link on a previous website led the visitor's browser 170 to the client website 110. This "credit" information is able to then be used in cooperation with the accounts database 320 and reporting manager 310 for reporting which party deserves credit for the transaction. In some embodiments, any click within a specified time period is eligible for credit. The time period is able to be specified by the client associated with the website. A variety of attribution allocation schemes are able to be selected by the client including equal distribution, recent weighted distribution, reverse time weighted distribution, and or other allocation schemes as are well known in the art. Alternatively, in some embodiments, an attribute manager (not shown) that is separate from the TEE 306 is utilized to determine credit allocation for visits/transactions.

The tag manager 302 of the enhanced tracking server performs multiple functions including storing the tracking tags including the third party tags in the content management DB. The tags are able to be executed in the tag execution engine 306 based on a set of rules. The tag manager 302 stores and executes the rules to which the tags apply to the different client web-pages or websites 110. The rules are able to be based on the URL of the page, for example, a rule is able to include a regular expression test of the URL such as "mysite.com/shopping/*." The rules are also able to be based on a flag passed in by the tag on the page (e.g. site/section/page ID) that indicates for example whether or not to allow regular expression (regexp) patterns against the client webpage or website 110 such as site/section/page ID. Regular expressions provide a concise and flexible means for identifying strings of text of interest, such as particular characters, words, or patterns of characters. The rules denoting where tags should be placed are also able to help to ease management of the tag placement. The tag manager 302 fetches existing tags from the client's website 110. The tag manager 302 utilizes a site crawler or an auto-extractor to accomplish the fetching. In one embodiment, the tag manager 302 is able to fetch a list of tag patterns or string within each tag, for example "doubleclick.com" or "atdmt.com." The tag manager 302 is able to capture the whole HTML tag block containing the pattern and present the tag blocks to the client for approval. The tag manager 302 also is able to insert the enhanced tracking tag block in the highest position of the removed tags or third party tags and builds the URL regexp patterns. As previously described, the third party tags and the tag patterns are able to be stored in the CMDB 312.

In some embodiments, the tag manager 302 comprises a user interface (not shown) for presenting tag management options to the clients associated with the client websites or webpages 110. In some embodiments, the user interface comprises graphical user interfaces (GUIs). Alternatively, the user interface is able to comprise any combination of GUIs, keyboards, mouses, display devices and other devices permitting a client to interact with a tag manager 302 as are well known in the art. Utilizing the user interface, the tag manager 302 is able to allow the client to select which of the third party tags found on the client website 110 are to be removed and stored on the enhanced tracking server 160 within the storage device 55 and which third party tags are to remain on the client website for execution by the visitor's browser 170. In some embodiments, utilizing the user interface, the tag manager 302 is able to allow the client to select which of the third party tags are to be executed by the enhanced tracking server 160 and which third party tags are to be executed by the visitor's browser 170. In some embodiments, the selection of execution and/or removal of the tags is provided to the user by the tag manager 302 in the form of a check box within the user interface.

In some embodiments, the tag manager 302 is configured to allow the clients to create one or more of the rules stored by the tag manager 302 in the CMDB 312, wherein the rules define which third party tags are removed or are to remain on the client website 110 and/or future websites associated with the client. In some embodiments, the one or more rules stored by the tag manager 302 are able to define which third party tags are executed on the enhanced server 160 and which are executed on the browser 170. The tag manager 302 is also able to override any rules or selections made by the client with regard to whether the tags are executed by the browser 170 or the server 160. Specifically, in some embodiment, upon failure of the enhanced server 160, the tag manager 302 causes all the third party tags to be executed by the visitor's browser 170. The tag manager 302 is then able to reestablish the execution of the selected tags on the enhanced server 160 upon the recovery of the enhanced server 160. Alternatively, upon the failure of the enhanced server 160, the tag manager 302 is able to utilize an alternate server (e.g. a proxy server) to execute the specified third party tags. In some embodiments, the tag manager 302 utilizes the user interface to allow the client to determine whether the enhanced tracking tag placed on the client website 110 utilizes JavaScript language or HTML. Alternatively, the tag manager 302 permits the client to select any tag programming language as are well known in the art.

In some embodiments, the tag manager 302 utilizes the user interface to allow the client to cause the enhanced tracking server 160 to utilize a redirect as discussed above. Specifically, instead of adding a JavaScript or HTML tag to the client website 110, when a client selects the redirect option, the enhanced tracking server 160 modifies the links to the client website 110 such that visitor's browsers 170 are first directed to the enhanced tracking server 160. Further, in some embodiments, one or both of the JavaScript/HTML option and redirect option are able to be defined by the clients according to the rules stored in the tag manager 302 CMDB 312. Thus, the tag manager 302 provides the advantage of allowing the administrator of a website or websites to customize where the tags are executed and/or the extent to which third party tags are removed, as well as providing a redirect option. Indeed, this advantage is further enhanced by the ability to includes rules that are able to be followed by the tag manager 302 with regard to future websites as well as the current websites.

The client websites or webpages 110 are able to be represented by a URL and a page label which is a string designated by the client and set in the enhanced tracking tag. The tags are named and assigned or mapped to either the URL or the page label. The mapping is able to be accomplished using mapping file syntax. A mapping or map file is used to demarcate a single mapping of a tag to a URL or page label. In some embodiments, the mapping file uses Extensible Markup Language (XML) syntax. One embodiment of a mapping file is illustrated below.

```
<mapping>
<uri> /index/* </uri>
<tagname> proi-landing </tagname>
</mapping>
<tag>
<tagname>proi-conversion</tagname>
<tagtext>
<script language='JavaScript' type='text/javascript'>
    <!--
    var az__p=location.protocol=='Error! Hyperlink reference not valid.';
    var az__r=Math.floor(Math.random( )*999999);
    document.write ("<" + "script language='JavaScript' ");
    document.write ("type='text/javascript' src='"+az__p);
    document.write ("//s1.srtk.net/www/delivery/lp.php");
    document.write
    ("?trackerid=9&bannerid=i7&source={derive}&rev=<revenue>"
+ escape(window.location) + "&referer=" + escape(document.referrer) +
"&r=" + az__r + "" + "><" + "/script>");
    //-->
    </script>
</tagtext>
</tag>
```

All of the tags are able to be terminated tags, (e.g., the tags have a <tag> and </tag>). The mapping file syntax includes mapping blocks, tag blocks and tagname blocks that represent blocks where a code such as JavaScript or other HTML code is specified. The tagname specifies the tag being mapped and the tagtext is the body of the tag. Within each tag, tag arguments are able to be included as unary tag specifiers, for example revenue, user-agent, referrer, IP, TN1-TN10: the client supplied parameters. In one embodiment, the enhanced tracking system will allow the client to record up to 10 arbitrary data items (for example TN1-TN10) with each conversion. Some examples of arbitrary data items include the number of items purchased, the zipcode, the pre-tax amount and the amount of tax.

The mapping of the tags demarcates a single mapping of a tag to a URL or page label. Within each mapping block, there is always URL or page label blocks and tag name blocks. In some embodiments, redundant enhanced tracking servers 160 are located in geographic regions within the proximity of the visitor's browsers 170 to receive the queues in each region. The enhanced tracking server 160 is able to also locate and return any third party tags mapped to execute on the visitor's browser 170 rather than the tag execution engine 306. In other embodiments, the browser environment of the browser 170 is encapsulated to allow it to be mimicked on the enhanced tracking server illustrated in FIG. 2 above. The browser environment includes items such as the user-agent of the browser, the IP address of the browser, various environmental fingerprints (such as the version of Flash installed), incoming URL to the page, the URL of the page itself and the Referrer. In other embodiments the enhanced tracking server 160 fetches third party tags for the webpage or website that was visited. Some examples of third party tags include Omniture tags, Doubleclick tags, Google Analytic tags and Atlas tags.

The enhanced tracking system includes the ability to mimic the geographic location of the original visitor's browser 170 by examining its IP address, then having the enhanced tracking server 160 contact the third party systems via proxy servers in the same geographic region as the original browser. The enhanced tracking system also has the ability to bridge between different types of tracking tag schemes or systems. For example, being able to use IMG tags for the enhanced tracking system, while being able to integrate with a third party system that uses JavaScript tags. Another example would be to use a web log-parsing front end for the enhanced tracking system (i.e. no tags on the website) which would nonetheless populate a third party system via traditional JavaScript tags. In addition, the enhanced tracking system is able to de-duplicate (de-dup) conversions for the third party systems. De-duplication in analytics and tracking industry is "double-counting". For example, double counting of a revisit from a user to a website as multiple visits from different users.

Figure 4:
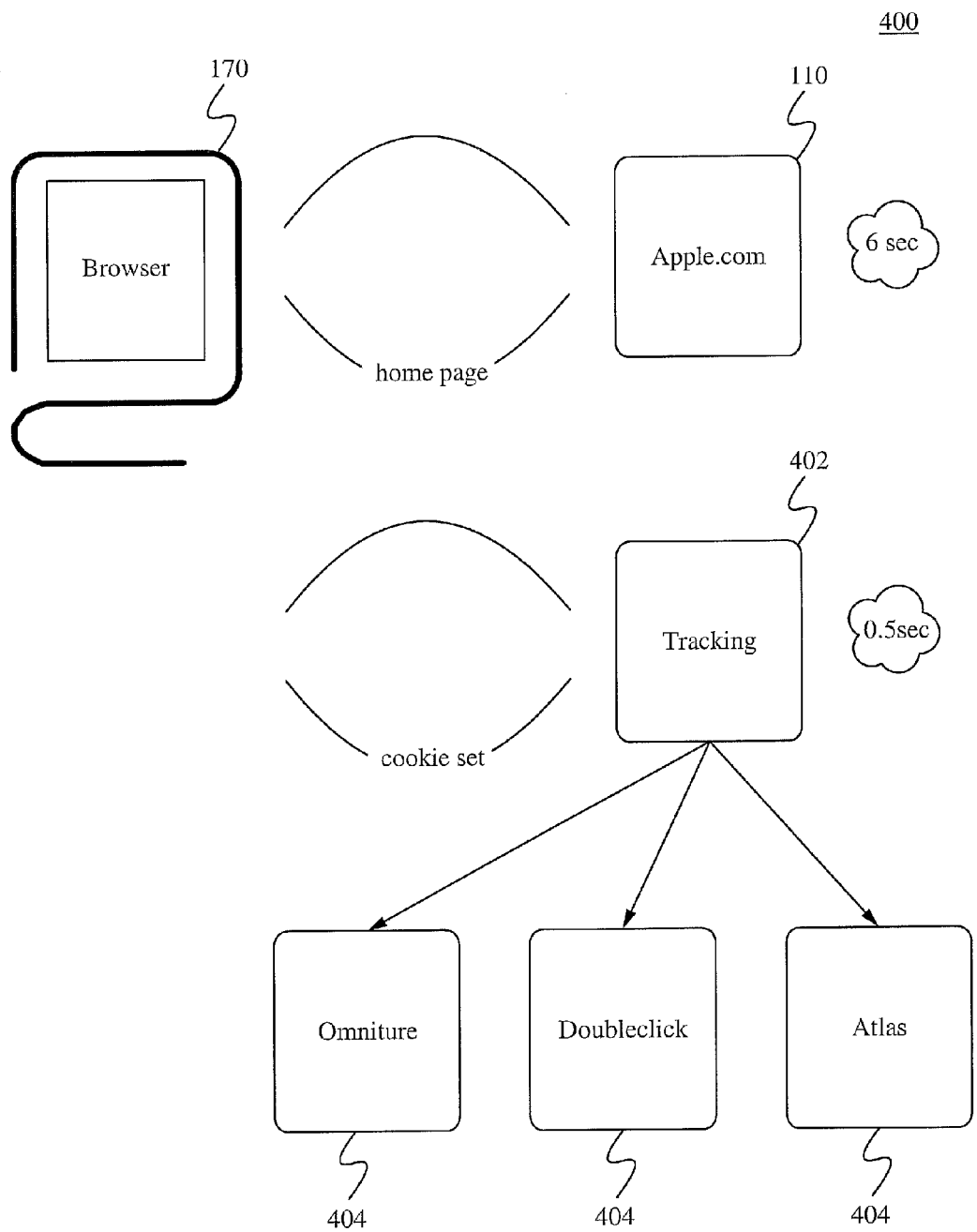
FIG. 4 illustrates an example of a tracking architecture with reduced processing time according to some embodiments.

FIG. 4 illustrates an example of a tracking architecture 400 with reduced processing time in comparison with the processing time of FIG. 1 according to some embodiments. The tracking architecture includes a visitor browser 170 associated with a computer system such as a personal computer, a client website 110, for example apple.com, an enhanced tracking tag 402 and third party tags 404 including Doubleclick®, Omniture® and Atlas®. When the visitor visits the client's website 170 the client's website is loaded on the visitor browser 170 within a period of time, for example 6 seconds. Also, the enhanced tracking tag 402 which is able to be embedded in the client's website 170 is executed on the visitor's browser 170 within a period of time, for example 0.5 sec. Unlike FIG. 1, where all of the third party tags 404 are executed on the visitor browser 170, in FIG. 4 the visitor browser 170 environment is encapsulated and mimicked on the enhanced tracking server 160 and the third party tags 404 extracted from the client websites 110 for execution at the tag execution engine 306. The execution time of the third party tags 404 does not add onto the page load time at the visitor's browser 170. Accordingly, the load time for the client's website 110 is reduced significantly.

Figure 5:
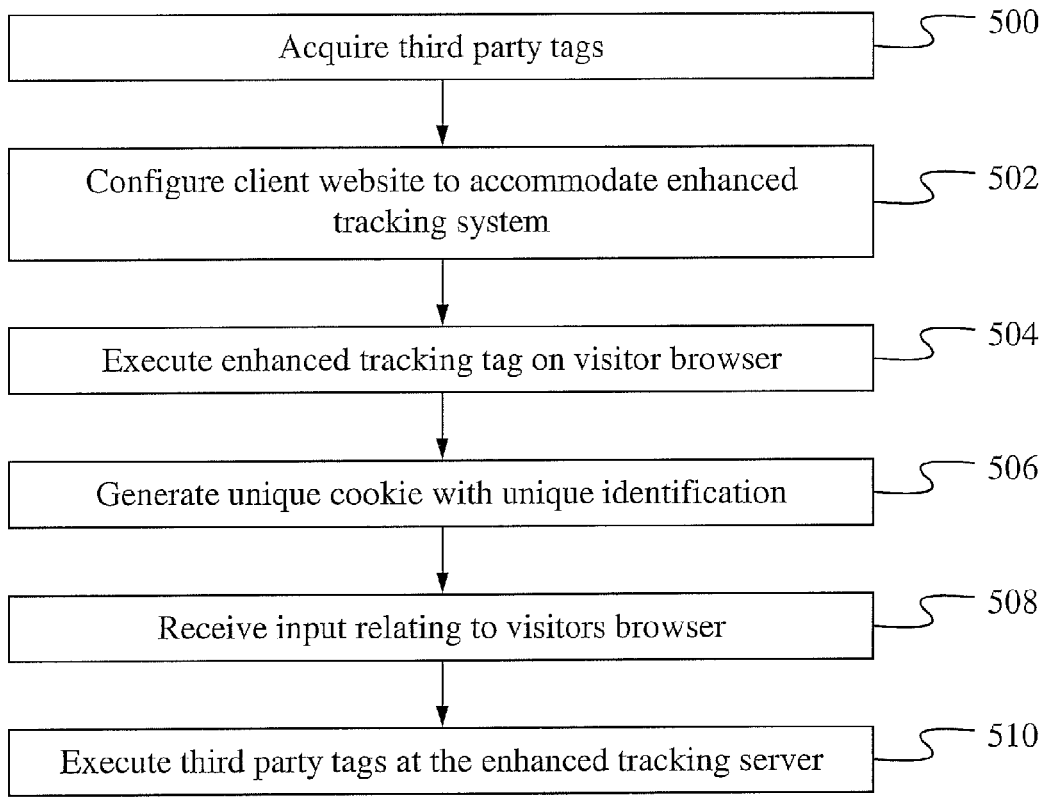
FIG. 5 illustrates a flow diagram of an enhanced process for tracking a website according to some embodiments.

FIG. 5 is a flow diagram of an enhanced process for tracking a website according to some embodiments. In one embodiment, the method is able to be implemented according to the browsing architecture of FIG. 3.

At block 500 the process starts with acquiring third party tags from the client websites 110 and 120. The enhanced tracking server 160 in conjunction with an auto-extractor for websites, for example, captures and removes or acquires the third party tags from the client websites 110 and 120. Alternatively, the third party tags are able to be identified and removed manually. In some embodiments, the third party tags are replaced with an enhanced tracking tag.

At block 502 the client website 110 is configured to accommodate an enhanced tracking system that includes the enhanced tracking server 160 of FIG. 2. When a visitor visits the client website 110, at block 504 the enhanced tracking code or tag is executed on the visitor's browser to track the public information of the visitor. The process then continues to block 506 where a unique cookie or other type of persistent data with a unique identification (ID) is generated for the visitor browser 170, for example, and stored on the visitor's computer/browser. The unique ID is able to include information such as the enhanced tracking tag version number, server identification, the client identification (ID), enhanced tracking tag ID, monotonically increasing number (local to this server), a time stamp in milliseconds, or other identifying information as is well known in the art. The cookie/ID generated by the enhanced tracking tag is able to be tracked over long periods of time, so that returning visitor's to the website 110 is able to be identified on future visits. Subsequently, when the visitor clicks on the website 110, the enhanced tracking server looks for the cookie/ID. If the cookie/ID is found, the visitor is identified as a returning visitor.

At block 508 the enhanced tracking server receives input relating to the visitor's browser 170 that allows the visitor's browser 170 to be mimicked on the enhanced tracking server. The inputs are able to be acquired and transmitted to the enhanced tracking server 160 in response to the execution of the enhanced tracking tag on the visitor's browser. The inputs are able to include browser environment information such as incoming URL parameters and referrer, visitor's browser IP address, URL of page, user-agent and other environmental fingerprints (e.g. version of Flash installed).

At block 510 the third party tags are executed on the enhanced tracking server, where the public information of the visitor's browser 170 is obtained indirectly from the mimicked browser without executing the third party tags on the visitor's browser 170.

Figure 6:
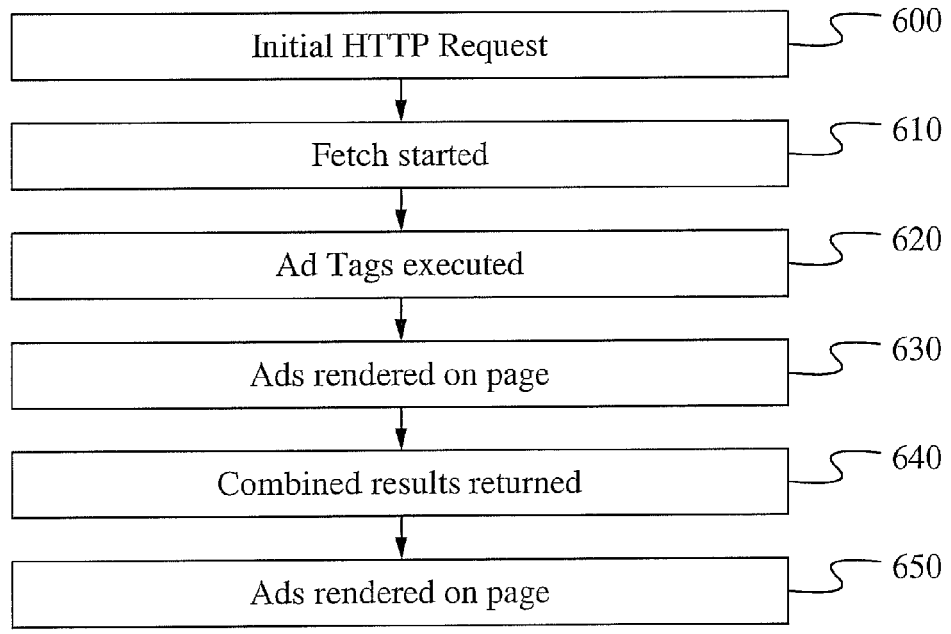
FIG. 6 illustrates a high level flow diagram of an enhanced process for rendering a web page using a enhanced tracking system according to some embodiments.

FIG. 6 is a high level flow diagram of an enhanced process for rendering a webpage associated with at least one tracking or ad serving tag using an enhanced tracking system according to some embodiments. The process illustrates the interaction between the browser of a visitor to a website 110 and an enhanced tracking server 160. The visitor's browser 170 makes an initial HTTP request to access the webpage at a client website. In some embodiments, the source content of a client's website is modified to replace blocks of HTTP code (or other markup language used to implement the site) with a special set of content accelerator tags. The content accelerator tags enable the browser to use the enhanced tracking server 160 to fetch the content associated with the content accelerator tags and corresponding third party ad serving tags. In some embodiments, content accelerator tags are able to be used to fetch some or all of the components of a webpage, such as text, images, audio, video, and/or other content from third party servers associated with the content.

Figure 11:
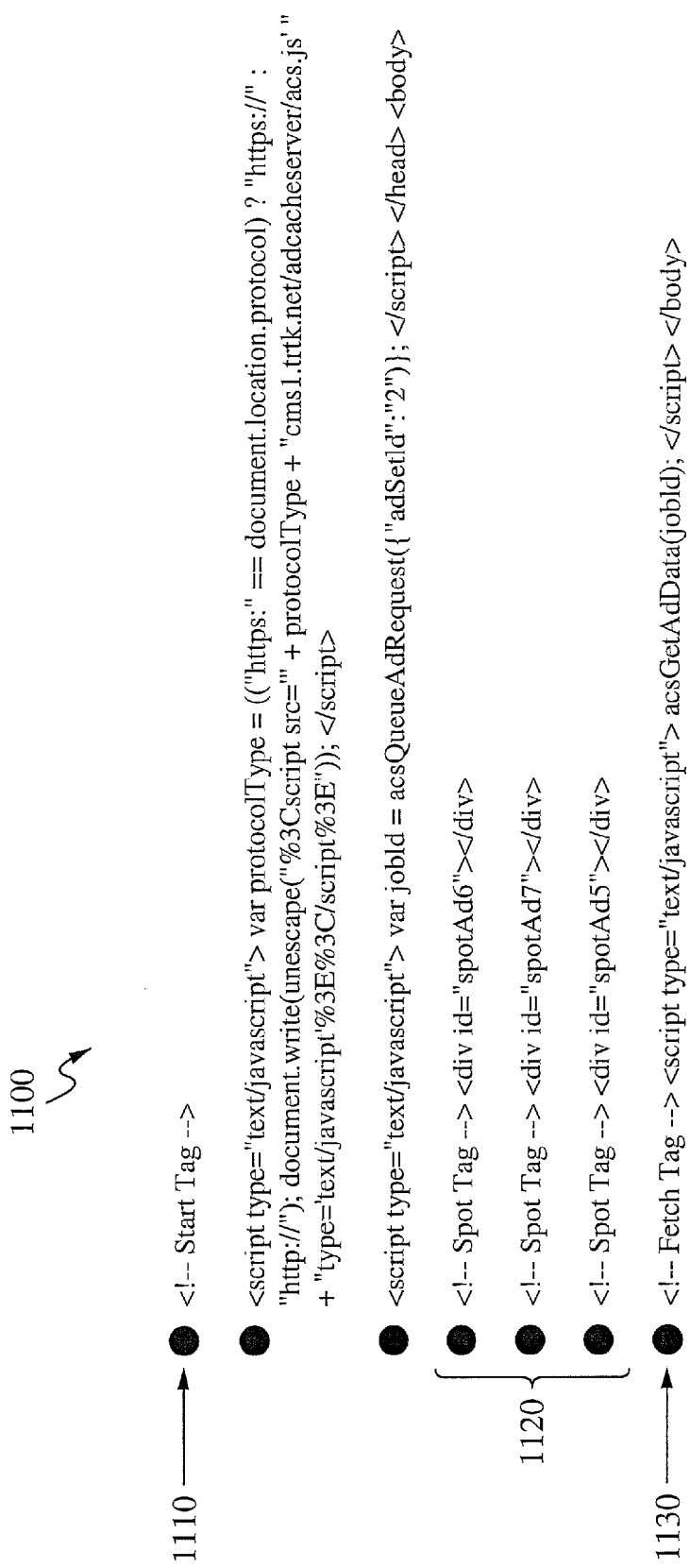
FIG. 11 illustrates examples of accelerator tags integrated into a webpage according to some embodiments.

The accelerator tags 1100 are able to include several different types of tags which are shown in an exemplary webpage illustrated in FIGS. 10 and 11: (1) spot tags (also referred to herein as placeholder tags) 1120, (2) start tags 1110, (3) fetch tags 1130, and tracking tags 1004. Spot tags are able to be embedded in the body of the webpage and act as a placeholder for content to be rendered on the webpage, where the content is to be fetched by enhanced tracking server 160. A spot tag is able to be implemented as an embedded script, such as JavaScript, and/or a markup language such as HTML. A spot tag is able to include various parameters that define the size, shape, location for the piece of content to be rendered on the webpage, and is able to also include a source identifier (e.g., a URL) that specifies that the content represented by the tag is able to be obtained at a specific network location. The spot tags enable the browser to begin rendering the webpage before the content associated with the spot tags is received from the enhanced tracking server 160. Because the browser knows the size and shape of the content represented by the image based on the information provided in the spot tag, the browser is able to reserve a space on the webpage for the content being fetched by enhanced tracking server 160. For example, a webpage is able to include twenty images, an embedded video, and four advertisements to be displayed. Each of the ten images, the embedded video, and the four advertisements are able to be represented by spot tags, that identify the content to be displayed and the size and location of that content.

Spot tags are able to also include executable script for rendering the content that is fetched by enhanced tracking server 160 and provided to the user's browser. According to some embodiments, the enhanced tracking server is able to provide executable content in response to a fetch tag (described in detail below) of a webpage being executed. The executable code is able to reference an image and/or other content to be rendered by the spot tags and is able to also include executable code that causes the spot tag scripts to be executed. For example, when at least one of the third party tags removed by the enhanced server 160 is an ad serving tag, the spot tags hold the place on the webpage where the ad content is to be rendered such that the browser 170 is able to render the remainder of the webpage. Additionally, the fetch tags upon execution cause the enhanced server 160 to retrieve the ad content from the third party servers associated with the third party ad serving tags and supply the content to the browser 170 for rendering in the spots reserved by the spot tags. This is contrasted to the enhanced tracking system's execution of third party tracking tags, which only requires a start tag to cause the enhanced server to execute the third party tracking tags stored on the enhanced server 160 so that the associated third party servers 130, 150 are able to track the browser visiting the client website 110.

A start tag is an executable tag that is executed when the browser loads the webpage. The start tag causes the browser to send an HTTP request to the enhanced tracking server 160 instructing the enhanced tracking server 160 to load the content associated with each of the spot tags included in the webpage. According to some embodiments, the start tag sends an identifier for a "tag set" or "page set" to the enhanced tracking server 160. A tag set identifier is a unique identifier associated with a set of content objects to be displayed on a webpage and/or tracking tags for tracking information about visitors to the website. The tag set identifier is assigned at the time that the webpage is created and included in the start tag. According to some embodiments, the start tag is able to be implemented as executable JavaScript embedded in the header of a webpage that is executed when the browser loads the webpage. Alternatively, other browser executable language is able to implement the start tag. In other words, a start tag is executed on a client web page 110, 120. In some embodiments, the start tag is positioned near or at the top of the web page such that the start tag is the first or one of the first portions of code executed when loading the web page 110, 120. When executed, the start tag triggers the enhanced server 160 to begin executing one or more third party tags associated with the web page 110, 120. In some embodiments, one or more of the third party tags have been removed from the web page 110, 120 and are stored on the enhanced server 160. The execution of the third party tags causes Ads to be fetched from the third party server 130, 150 for the ad serving tags of the third party tags, and causes tracking data to be sent/received to and from the third party servers 130, 150 for the tracking tags of the third party tags. In particular, regarding the execution of the ad serving tags, the call for Ads is asynchronous as the browser 170 does not wait for the Ads to be returned. As a result, a fetch tag (as described below) will later need to be executed.

A fetch tag is also an executable tag that is included in a webpage. According to some embodiments, the fetch tag is executed after the webpage has been loaded, the start tag has been executed, and the page has been rendered with the placeholders for the content represented by the content accelerator tags. The fetch tag, once executed, waits for the enhanced tracking server 160 to complete processing of the fetch of the content represented by the content accelerator tags and to receive the content from the enhanced tracking server 160. According to other embodiments, the fetch tag is able to be executed before the entire webpage has loaded. In some embodiments, the fetch tag is able to also include logic for receiving aggregated content from the enhanced tracking server 160, de-aggregating the content for rendering on the webpage, and providing the de-aggregated content to the spot tags for rendering.

According to some embodiments, the fetch tag executes an HTTP GET call to the enhanced tracking server 150 and provides the tag set identifier associated with the page to the enhanced tracking server 160. The tag set identifier identifies the client whose webpage is being processed as well as the actual set of tags that are included in that page and will need to be processed by the enhanced tracking server 160. The enhanced tracking server 160 associates the fetched content with the tag set identifier provided in the start tag and provides the content in response to the fetch tag executing the HTTP GET. In other words, a fetch tag is also able to be included on a client web page 110, 120 such that the fetch tag is also executed upon loading of the web page 110, 120. In some embodiment, the fetch tag is positioned lower on the web page 110, 120 than the start tag in order to retrieve the Ads that the enhanced server 160 has received from the third party servers 130, 150 (as a result of the prior execution of the third party ad serving tags on the enhanced server 160 as described above). Upon receipt of the ad content from the enhanced server 160, the content is given to the appropriate waiting spot tags such that the content is able to be displayed on the web page in the spots reserved by the spot tags.

Additional information, such as a cookie/persistent data ID is able to be provided to the enhanced tracking server 160 by the fetch tag. If the visitor's browser has visited a site that uses the enhanced tracking server 160 before, the enhanced tracking server 160 is able to have placed a browser-side cookie or other type of persistent data/identifier on the visitor's computer system. The browser-side cookie/data contains a cookie/data ID that is able to be used to identify server-side cookies or other types of persistent data such as a browser environment associated with the browser. The enhanced tracking server 160 is able to maintain server-side cookies/data for each visitor to a website that uses the enhanced tracking server 160. The server-side cookies/data are able to be used to maintain the previous context of a visitor's session to the website. For example, the server-side cookies/data track a visitor's site preferences, contents of a visitor's shopping cards, or for maintaining the state of a visitor's session.

Additional environmental factors are able to also be passed to the enhanced tracking server 160 by the fetch tag, such as the IP address of the visitor's computer on which the browser is running, the URL of the page that the visitor has requested, the user-agent (type and version) of the browser, the referrer URL, the size of the display screen, and the version of the Flash plug-in that is installed, and/or other information about the computer environment in which the visitor's browser is being executed is able to be provided to the enhanced tracking server 160.

According to some embodiments, the enhanced tracking server 160 will determine whether all of the content from the tracking servers has been retrieved and whether all of the tracking servers have been contacted before returning a result to the visitor's browser.

In operation, one or more third party tags are able to be extracted from the client website and replaced with at least one enhanced tag associated with the enhanced server 160. In some embodiments, the one or more third party tags are extracted manually. Alternatively, the tags are able to be extracted automatically by the enhanced tracking server 160. In some embodiments, a client is presented with a user interface that allows the user to choose which tags are extracted from the client website. The extracted tags are able to be received and stored at the enhanced server. When a visitor browser 170 attempts to display the client website to a user a start tag on the client website is executed sending a message to the enhanced server to execute the one or more tags stored on the enhanced server. In some embodiments, the client is presented with the user interface such that the client is able to choose which of the tags are executed on the enhanced server 160 and which art executed on the browser 170. In some embodiments, the tags are executed in parallel. In some embodiments, wherein at least one of the tags is an ad serving tag, further spot and fetch tags on the client website are executed as described above. In some embodiments, if not already stored, the environment of the browser is mimicked with the enhanced servers by storing elements of the browser environment and cookies/data on the browser in a persistent storage on the enhanced server 160. In such embodiments, a browser identifier created by the enhanced server to uniquely identify the browser and correlate the browser to the stored environment and cookie/data is also stored in the persistent storage as well as in storage on the browser itself. As a result, the browser 170 is able to use the identifier to identify itself to the enhanced server 160 during future visits to the website or other website utilizing the enhanced server 160. Upon execution of the tags on the enhanced server 160 the cookie/data and environment information related to the browser is sent to one or more third party servers associated with the one or more tags as if the browser 170 was executing the third party tags. In some embodiments, which of the one or more third party servers is to be credited for a transaction made by the user of the browser during the visit is determined based on the persistent storage on the enhanced server 160.

As shown in FIG. 6, in some embodiments, the visitor's browser 170 first initiates an initial HTTP request (stage 600). In some embodiments wherein the one or more third party tags only comprise tracking tags, only a start tag is executed in response to the initial HTTP request. The start tag causes the browser to send a message to the enhanced tracking server that instructs the enhanced tracking server 160 to execute any tracking tags that are associated with the webpage. In such embodiments, further tags (e.g. fetch tags) are not required because the third party tracking tags never return any ads or other content to the browser. Alternatively in response, a fetch is started as the initial fetch tag is executed (stage 610). In some embodiments, the enhanced tracking server 160 is able to fetch the images and/or other content associated with the content accelerator tags in parallel (stage 620). The content is able to be fetched from multiple content sources, such as third party servers 130 and 150. Once the enhanced tracking server 160 has received the content from the various content sources (stage 630), the enhanced tracking server 160 is able to aggregate some or all of the content into a single content object (stage 630) that is then transferred to the visitor's browser (stage 640), and the browser renders the contents (stage 650). For example, two or more images fetched by the enhanced tracking server 160 is able to be appended into single image file that is provided to the browser on the visitor's computer. The fetch tag de-aggregates the content and provides the de-aggregated content to the spot tags for rendering into the webpage. In some embodiments, the aggregation of some or all of the content into a single object by the tracking server (stage 630) is able to be omitted.

Figure 7:
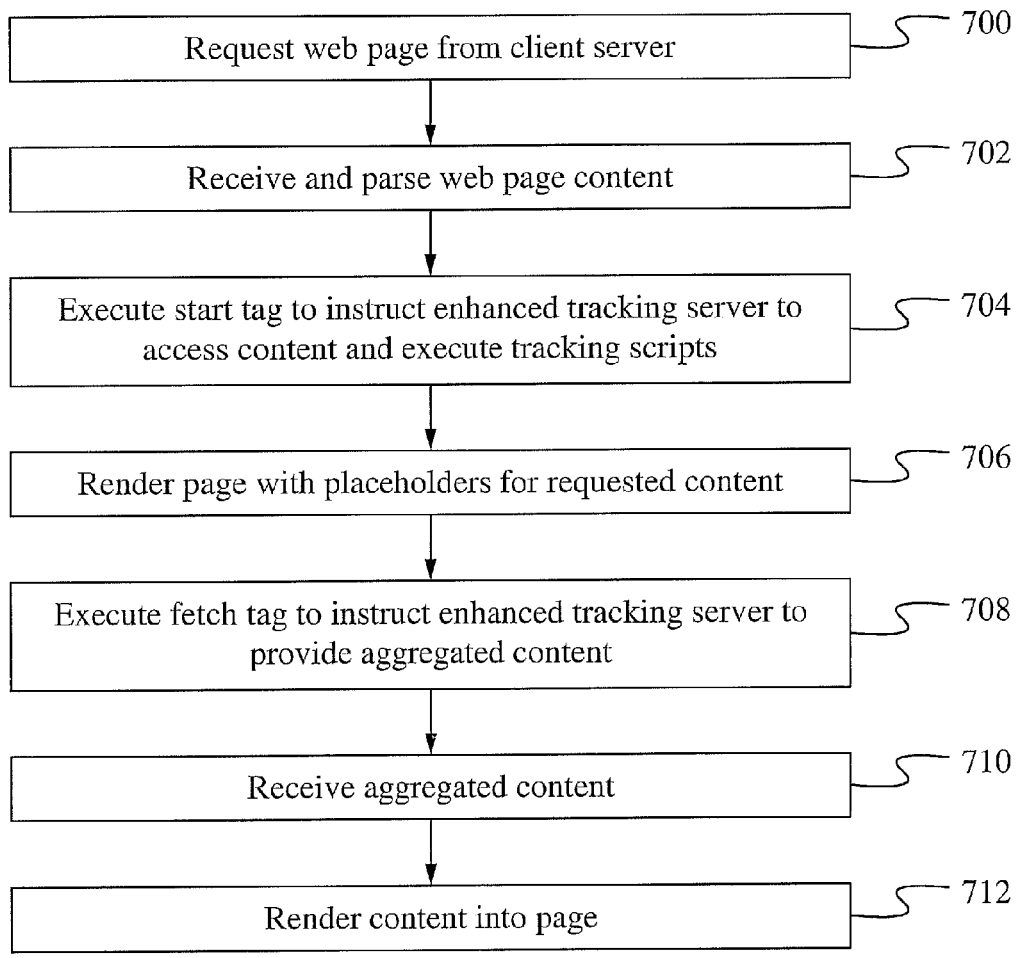
FIG. 7 illustrates a high-level flow diagram of an enhanced process for rendering a webpage with a enhanced tracking system according to some embodiments.

FIG. 7 illustrates a high-level flow diagram of an enhanced process for rendering a webpage in a browser according to some embodiments. At block 700, the process starts with a browser on a visitor's computer 170 requesting a webpage from a client website 110. In some embodiments, the source content of a client's website is modified to replace ad serving HTTP code blocks (also referred to herein as third party tags) with a special set of content accelerator tags that will be used to request content associated with the content accelerator tags from enhanced tracking server 160. In the embodiment illustrated in FIG. 7, the content accelerator tags are only used for fetching advertisement content, but in other embodiments, content accelerator tags are able to be used to request some or all of the components of a webpage, such as text, images, audio, video, and/or other content. When the client website 110 receives a request from the visitor's browser to display the website content, the client website provides modified webpage in response to the request.

At block 702, the visitor's browser 170 receives the webpage from the client website 110 and parses the webpage in order to render the content. The webpage content is able to be encoded using markup language, such as Hypertext Markup Language (HTML), Extensible Markup Language (XML), or another markup language, and is able to include links to one or more pieces of remote content located on the third-party content servers 130 and 150, as well as content accelerator tags that represent content to be included in the webpage.

At block 704, the visitor's browser 170 executes a start tag that causes the browser to send a message to the enhanced tracking server 160. The message instructs the enhanced tracking server 160 to fetch the content associated with the content accelerator tags embedded in the webpage and to execute any tracking tags that are included in the webpage. In some embodiments, the enhanced tracking server 160 performs HTTP requests in parallel to fetch the content associated with the content accelerator tags from the third party servers 130 and 150. In some embodiments, the start tag is implemented as executable JavaScript tag. As described above, the start tag provides a unique tag set id (or browser identifier) to the enhanced tracking server that identifies which content is to be fetched and/or which tracking tags are to be executed. Enhanced tracking server 160 is able to include a database or datastore 55 in which the mappings between tag set identifiers and their associated content and/or where their tracking tags are stored.

At block 706, the browser on computer 170 renders the webpage, leaving placeholders for the advertisements until the advertisement content has been fetched by the enhanced tracking server 160. The size and location of the placeholders are able to be determined from spot tags that represent the advertisement content. The placeholders are able to later be replaced with the advertisement content once the enhanced tracking server 160 fetches the content and provide the content to the browser on the visitor's computer 170.

At block 708, a fetch tag embedded in the webpage is executed after the page has been rendered including the placeholders. As described above, the fetch tag is a blocking tag that waits for the enhanced tracking server 160 to fetch the content associated with the content accelerator tags and to provide the fetched content to the browser. According to some embodiments, the fetch tag executes an HTTP GET call to the enhanced tracking server 160. The enhanced tracking server 160 then provides the content that the enhanced tracking server 160 fetched in response to the start tag being executed. When the browser receives the content from the enhanced tracking server 160, a script is executed by the browser that parses the aggregated content. According to some embodiments, the aggregated content is able to include spot tag identifiers that identifies which content is associated with which spot tag on the webpage. The content is deaggregated (if it was aggregated) and provided to the appropriate spot tag for rendering on the webpage.

At block 710, the visitor's web browser receives the requested content from the enhanced tracking server 160. As described above, this content is able to be aggregated into a single content object that is provided to the browser. For example, the enhanced tracking server 160 is able to aggregate requested images into a single image that, once received by the visitor's web browser, is partitioned by the fetch tag and passed to the individual spot tags to be rendered into the placeholder area defined by the spot tag. According to some embodiments, the enhanced tracking server 160 is able to not aggregate the requested content, and is able to instead return a set of links (e.g., URLs) to the individual content object, such as individual images, and wherein the fetch tag loads the individual images or other content objects using the links provided by the enhanced tracking server 160.

At block 712, the content received from the enhanced tracking server 160 is rendered into the placeholders on the webpage using the spot tags.

Figure 8:
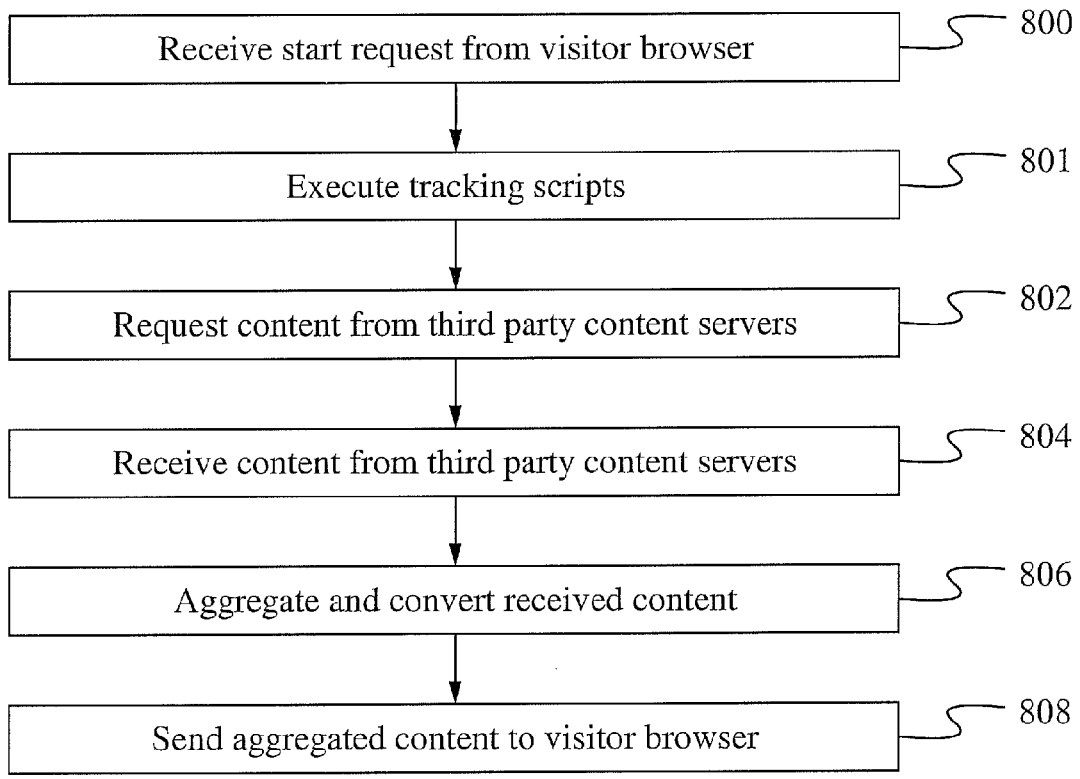
FIG. 8 illustrates a high-level flow diagram of a process for an enhanced process for fetching content for a webpage and for executing tracking scripts using a enhanced tracking server according to some embodiments.

FIG. 8 is a high-level flow diagram of a process for an enhanced process for fetching content for a webpage and for executing tracking scripts using an enhanced tracking server according to some embodiments. At block 800, a start request is received from a visitor's browser 170. At block 801, the enhanced tracking server executes any tracking or ad serving scripts that are associated with the webpage. Enhanced tracking server is able to make one or more HTTP requests to the tracking servers to update the information that is maintained by the tracking servers. In some embodiments, if only tracking scripts/tags have been removed from the website and stored on the enhanced tracking server 160, upon receipt of the start request, a start tag causes the browser to send a message to the enhanced tracking server that instructs the enhanced tracking server 160 to execute any tracking tags that are associated with the webpage. In such embodiments, further tags (e.g. fetch tags) are not required because the third party tracking tags never return any ads or other content to the browser.

At block 802, the content represented by the content accelerator tags is requested from the third party content provider servers 130 and 150 using parallel HTTP requests. The enhanced tracking server 160 executes many or all of the HTTP requests in parallel in order to reduce the amount time required to fetch the content required to render the page. At block 804, the requested content is received from the third party content provider servers 130 and 150.

At block 806, the enhanced tracking server 160 aggregates and converts the received content into another format. For example, the enhanced tracking server is able to aggregate image content into a single image that is transferred to the visitor browser. In some embodiments, the enhanced tracking server 160 is able to also convert and/or modify the format of content objects prior to providing the content objects to visitor browser. For example, enhanced tracking server 160 is able to convert fetched content to a PDF file, a Flash file, or an image file such as GIF or a JPG image file. According to some embodiments, the enhanced tracking server 160 is able to also convert the images and/or other convent objects received to match the format of a screen on which a visitor's browser is being displayed. For example, the enhanced tracking server 160 is able to decrease the resolution of content objects for display on a mobile device, such as a mobile phone. As a result, the images and/or other content would require less bandwidth to be transmitted to the mobile device, without sacrificing image quality on the display. According to some embodiments, aggregation and/or conversion are optional, and one or both of these steps are able to not be performed. According to some embodiments, the determination whether to perform a conversion on content is able to be made based on the type of client on which the visitor's browser is running. For example, if a user is attempting to view content from a mobile device, such as an IPHONE®, the content might be converted to a PDF by the enhanced tracking server 160 before sending the content to the visitor's browser. Alternatively, block 806 is able to be omitted.

At block 808, the enhanced tracking server 160 sends the fetched content, which is able to also be aggregated and/or converted to a new format, to the browser on the visitor's computer 170. In some embodiments, the enhanced tracking server 160 is able to instead transmit a URL or other link to the visitor's browser that is able to be used to retrieve the content fetched by enhanced tracking 160.

Figure 9:
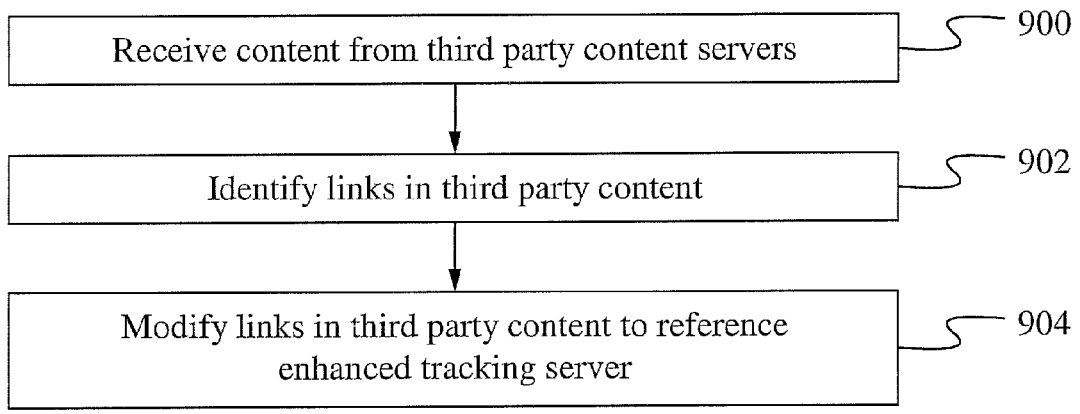
FIG. 9 illustrates a flow diagram of process for modifying web content using a enhanced tracking server according to some embodiments.

FIG. 9 is a flow diagram of process for modifying web content using an enhanced tracking server according to some embodiments. The enhanced tracking server 160 is able to modify links of content objects that include links to other content before providing the content to visitor browser 170. The enhanced tracking server 160 modifies the links to reference the enhanced tracking server 160 so that any subsequent activation of those links ensures that the user is redirected to the content references by the link through the enhanced tracking server 160.

At block 900, content is received from a third party server 130. For example, the third party server 130 is able to be an ad server and the content is able to be an electronic advertisement that includes a link to a landing page to which a visitor is redirected if the visitor clicks on the advertisement.

At block 902, the enhanced tracking server 160 identifies links in the received content. For example, the enhanced tracking server 160 is able to identify links to content that would cause the visitor to be redirected to content without being routed through the enhanced tracking server 160. The enhanced tracking server 160 is able to maintain cookies or other types of persistent data for the visitor that include public information about visitor (e.g., type of operating system and browser version) and other information regarding the browsing history of the visitor. If the user were redirected by a link in content provided by the enhanced tracking server 160 that did not redirect the visitor though the enhanced tracking server 160, the relevant context information stored in the cookies/data on the enhanced tracking server 160 would not be available to the webpage to which the visitor was redirected.

At block 904, the enhanced tracking server 160 modifies links in third party content to reference the enhanced tracking server 160. Therefore, if a visitor clicks on or otherwise activates a link or other navigational element embedded in the received convent, the visitor is redirected to the content referenced in the link via the enhanced tracking server 160.

Those of skill will appreciate that the various illustrative logical blocks, modules, and algorithm steps described in connection with the embodiments disclosed herein are able to often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the design constraints imposed on the overall system. Skilled persons are able to implement the described functionality in varying ways for each particular application, but such implementation decisions should not be interpreted as causing a departure from the scope of the invention. In addition, the grouping of functions within a module, block or step is for ease of description. Specific functions or steps are able to be moved from one module or block without departing from the invention.

The various illustrative logical blocks and modules described in connection with the embodiments disclosed herein are able to be implemented or performed with a general purpose processor, a digital signal processor (DSP), application specific integrated circuit (ASIC), a field programmable gate array (FPGA) or other programmable logic device, discrete gate or transistor logic, discrete hardware components, or any combination thereof designed to perform the functions described herein. A general-purpose processor is able to be a microprocessor, but in the alternative, the processor is able to be any processor, controller, microcontroller, or state machine. A processor is able to also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein is able to be embodied directly in hardware, in a software module executed by a processor, or in a combination of the two. A software module is able to reside in RAM memory, flash memory, ROM memory, EPROM memory, EEPROM memory, registers, hard disk, a removable disk, a CD-ROM, or any other form of storage medium. An exemplary storage medium is able to be coupled to the processor such that the processor is able to read information from, and write information to, the storage medium. In the alternative, the storage medium is able to be integral to the processor. The processor and the storage medium is able to reside in an ASIC.

The above description of the disclosed embodiments is provided to enable any person skilled in the art to make or use the invention. Various modifications to these embodiments will be readily apparent to those skilled in the art, and the generic principles described herein are able to be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. An enhanced tracking system over a network comprising:
    a. a visitor computing device coupled to the network and including a browser for displaying websites to a user;
    b. a client website coupled to the network having one or more tags;
    c. one or more enhanced servers coupled to the network for acquiring at least one of the one or more tags from the client website; and
    d. one or more third party servers coupled to the network and associated with the one or more tags such that the tags refer to the one or more third party servers;
wherein the enhanced servers execute the at least one of the one or more tags when the browser attempts to display the client website.

2. The system of claim 1 wherein the one or more tags comprise one or more of tracking tags and ad serving tags.

3. An enhanced tracking system over a network comprising:
    a. a visitor computing device coupled to the network and including a browser for displaying websites to a user;
    b. a client website coupled to the network having one or more tags;
    c. one or more enhanced servers coupled to the network for acquiring at least one of the one or more tags from the client website; and
    d. one or more third party servers coupled to the network and associated with the one or more tags such that the tags refer to the one or more third party servers;
wherein the enhanced servers execute the at least one of the one or more tags when the browser attempts to display the client website, wherein the enhanced servers execute the at least one of the one or more tags in parallel.

4. The system of claim 1 wherein the enhanced servers automatically extract all of the one or more tags from the client website.

5. The system of claim 1 wherein the enhanced servers selectively extract the at least one of the one or more tags from the client website based on selections by a client associated with the client website.

6. The system of claim 1 further comprising a user interface that permits the client to select which of the one or more tags are executed on the enhanced servers and which of the one or more tags are executed on the browser.

7. The system of claim 4 wherein the extracted tags are replaced on the client website by at least one enhanced tracking tag associated with the enhanced servers.

8. The system of claim 7 wherein the enhanced servers utilize the enhanced tracking tag to mimic the environment of the browser.

9. The system of claim 8 wherein the execution of the at least one of the one or more tags is based on the browser environment.

10. The system of claim 9 wherein the browser environment comprises one or more of a user-agent of the browser, the IP address of the browser, an environmental fingerprint, an incoming URL to the website, the URL of the website and a tag execution engine.

11. The system of claim 10 wherein the one or more enhanced servers further comprises a persistent storage, and further wherein the browser environment and at least one browser identifier correlating the browser environment to the browser are stored in the persistent storage.

12. The system of claim 11 wherein the persistent storage comprises a cookie database or a flash variable data storage.

13. The system of claim 11 wherein the browser further comprises one or more persistent data values that are also stored in the persistent storage, wherein the browser identifier correlates the browser with the one or more persistent data values.

14. The system of claim 13 wherein based on the persistent storage the one or more enhanced servers are able to determine which of the one or more third party servers is to be credited for a transaction.

15. The system of claim 1 wherein a proxy application stored on at least one of the one or more enhanced servers selects a designated proxy server of the one or more enhanced servers to communicate with the one or more third party servers during the execution process.

16. The system of claim 15 wherein the proxy application selects the designated proxy server based on the geographical proximity of the designated proxy server to an IP address of the browser.

17. The system of claim 4 wherein the enhanced servers are able to modify a link leading to the client website such that the link points to the enhanced servers thereby directing the browser to the enhanced servers.

18. The system of claim 17 wherein the link includes identification corresponding to the client website such that the enhanced tracking servers are able to redirect the browser to the client website.

19. The system of claim 1 wherein if the one or more enhanced servers fail, all of the one or more tags are executed on the browser until the enhanced servers are restored.

20. The system of claim 1 wherein the enhanced servers execute the at least one of the one or more tags on the browser if the at least one of the one or more tags cannot be properly executed by the enhanced servers.

21. The system of claim 1 wherein the enhanced servers pass one or more variables associated with the client website from the client website to the one or more third party servers for storage on the third party servers.

22. A method of tracking a client website over a network comprising:
    a. extracting from the client website at least one of one or more tags;
    b. receiving the at least one of the one or more tags at one or more enhanced servers;

c. executing the at least one of the one or more tags on the one or more enhanced servers when a browser on a visitor computing device attempts to display the client website to a user; and
d. accessing one or more third party servers associated with the at least one of the one or more tags with the one or more enhanced servers in order to execute the at least one of the one or more tags.

23. The method of claim 22 wherein the one or more tags comprise one or more of tracking tags and ad serving tags.

24. A method of tracking a client website over a network comprising:
a. extracting from the client website at least one of one or more tags;
b. receiving the at least one of the one or more tags at one or more enhanced servers;
c. executing the at least one of the one or more tags on the one or more enhanced servers when a browser on a visitor computing device attempts to display the client website to a user; and
d. accessing one or more third party servers associated with the at least one of the one or more tags with the one or more enhanced servers in order to execute the at least one of the one or more tags;
wherein the enhanced servers execute the at least one of the one or more tags in parallel.

25. The method of claim 22 wherein the extraction of the at least one of the one or more tags comprises the enhanced servers automatically extracting all of the one or more tags from the client website.

26. The method of claim 22 wherein the extraction of the at least one of the one or more tags comprises the enhanced servers selectively extracting the at least one of the one or more tags based on selections by a client associated with the client website.

27. The method of claim 22 further comprising permitting the client to select which of the one or more tags are to be executed on the enhanced servers and which are to be executed on the browser.

28. The method of claim 22 further comprising replacing the extracted tags on the client website with at least one enhanced tracking tag associated with the enhanced servers.

29. The method of claim 28 further comprising mimicking the environment of the browser with the enhanced servers utilizing the enhanced tracking tag.

30. The method of claim 29 wherein the execution of the at least one of the one or more tags is based on the browser environment.

31. The method of claim 30 wherein the browser environment comprises one or more of a user-agent of the browser, the IP address of the browser, an environmental fingerprint, an incoming URL to the website, the URL of the website and a tag execution engine.

32. The method of claim 31 further comprising storing the browser environment and identification data correlating the browser environment to the browser in a persistent storage on the one or more enhanced servers.

33. The method of claim 32 wherein the persistent storage comprises a cookie database or a flash variable data storage.

34. The method of claim 32 further comprising storing one or more persistent data values of the browser in the persistent storage, wherein the browser identifier correlates the browser with the one or more persistent data values.

35. The method of claim 34 further comprising determining which of the one or more third party servers is to be credited for a transaction based on the persistent storage with the one or more enhanced servers.

36. The method of claim 22 further comprising selecting a designated proxy server of the one or more enhanced servers to communicate with the one or more third party servers during the execution process with a proxy application stored on at least one of the one or more enhanced servers.

37. The method of claim 36 wherein the proxy application selects the designated proxy server based on the geographical proximity of the designated proxy server to an IP address of the browser.

38. The method of claim 22 further comprising modifying a link to the client website with the enhanced servers such that the link points to the enhanced servers thereby directing the browser to the enhanced servers.

39. The method of claim 38 wherein the link includes identification corresponding to the client website such that the enhanced tracking servers are able to redirect the browser to the client website.

40. An enhanced tracking server for tracking a client website comprising:
a non-transitory computer-readable medium storing:
a. an extraction application, wherein the extraction application extracts at least one of one or more tags from the client website; and
b. a tag execution engine, wherein the tag execution engine receives browser information related to a browser on a visitor computing device, executes the at least one of the one or more tags with the browser information when the browser attempts to display the client website, wherein the at least of the one or more tags are associated with one or more third party servers such that the at least one of the one or more tags refer to the one or more third party servers.

41. The server of claim 40 wherein the one or more tags comprise one or more of tracking tags and ad serving tags.

42. An enhanced tracking server for tracking a client website comprising:
a non-transitory computer-readable medium storing:
a. an extraction application, wherein the extraction application extracts at least one of one or more tags from the client website; and
b. a tag execution engine, wherein the tag execution engine receives browser information related to a browser on a visitor computing device, executes the at least one of the one or more tags with the browser information when the browser attempts to display the client website, wherein the at least of the one or more tags are associated with one or more third party servers such that the at least one of the one or more tags refer to the one or more third party servers;
wherein the tag execution engine executes the at least one of the one or more tags in parallel.

43. The server of claim 40 wherein the extraction application automatically extracts all of the one or more tags from the client website.

44. The server of claim 40 further comprising a tag manager that permits a client associated with the client website to select which of the one or more tags are extracted from the client website.

45. The server of claim 44 wherein the tag manager further permits the client associated with the client website to select which of the one or more tags are executed by the browser and which are executed by the enhanced server.

46. The server of claim 40 wherein the enhanced server utilizes an enhanced tracking tag on the client website to mimic the environment of the browser.

47. The server of claim 46 wherein the execution of the at least one of the one or more tags is based on the browser environment.

48. The server of claim 47 wherein the browser environment comprises one or more of a user-agent of the browser, the IP address of the browser, an environmental fingerprint, an incoming URL to the website, the URL of the website and a browser tag execution engine.

49. The server of claim 40 further comprising an enhanced persistent storage that stores all persistent data values found on each browser that attempts to display the client website along with a browser identifier that correlates each browser with the corresponding stored persistent data values.

50. The server of claim 49 wherein the persistent storage is a cookie database or a flash variable data storage.

51. The server of claim 49 wherein the browser environment is stored in the persistent storage, wherein the browser identifier correlates the browser environment to the browser.

52. The server of claim 51 wherein based on the persistent storage the server is able to determine which of the one or more third party servers is to be credited for a transaction.

53. The server of claim 40 further comprising a proxy application that selects a designated proxy server of the one or more additional enhanced servers to communicate with the one or more third party servers during the execution process.

54. The server of claim 53 wherein the proxy application selects the designated proxy server based on the geographical proximity of the designated proxy server to an IP address of the browser.

55. The server of claim 40 further comprising a modification element that modifies a link leading to the client website such that the link points to the enhanced server thereby directing the browser to the enhanced server.

56. The server of claim 55 wherein the link includes identification corresponding to the client website such that the enhanced tracking server are able to redirect the browser to the client website.

57. A tag manager stored on non-transitory computer-readable medium on one or more tag tracking servers and for presenting a client associated with a client website with tag management options, the tag manager comprising:
   a. a content database comprising one or more tags from the client website, wherein the storage of the one or more tags in the content database is not dependent on storage of the remainder of data of the client website in the content database; and
   b. a user interface that permits the client to select which of one or more third party tags on the client website are to be extracted from the client website and stored in the content database.

58. The tag manager of claim 57 wherein the user interface permits the client to select which of the third party tags are executed on the one or more servers and which of the third party tags are executed on a browser when a user attempts to display the client website on the browser.

59. The tag manager of claim 57 wherein the user interface permits the client to select a programming language to which an enhanced tracking tag to be placed on the client website conforms.

60. The tag manager of claim 59 wherein the programming language comprises JavaScript or HTML.

61. The tag manager of claim 57 wherein the user interface permits the client to select a redirect option that causes the one or more servers to place a pointer on links to the client website such that when the user attempts to display the client website a browser of the user is first directed to the one or more servers.

62. The tag manager of claim 57 wherein the content database further stores one or more rules, and further wherein the tag manager executes the selected third party tags based on the one or more stored rules.

63. The tag manager of claim 62 wherein the rules are based on one or more of the URL of the client website and a flag on one or more of the third party tags.

64. A database stored on a non-transitory computer-readable medium on one or more tag tracking servers for tracking users of a client website, the database comprising:
   a. one or more persistent data values found on each browser of the users that attempt to display the client website;
   b. one or more browser identifiers for each browser, wherein the browser identifiers correlate each browser with the corresponding stored persistent data values found on each browser;
   c. one or more browser environments associated with each browser that attempts to display the client website, wherein the browser identifiers correlate each browser with the corresponding stored browser environments found on each browser; and
   d. one or more tags extracted from the client website and stored independent of the remainder of the client website.

65. The database of claim 64 wherein the browser environments comprise one or more of a user-agent of the browser, the IP address of the browser, an environmental fingerprint, an incoming URL to the client website, the URL of the client website and a browser tag execution engine.

66. The database of claim 64 wherein the browser environments comprise data necessary to properly format web pages on the associated browser.

\* \* \* \* \*